US008248634B2

(12) United States Patent
Ishida et al.

(10) Patent No.: US 8,248,634 B2
(45) Date of Patent: Aug. 21, 2012

(54) JOB PROCESSING SYSTEM AND IMAGE PROCESSING APPARATUS

(75) Inventors: Tetsuya Ishida, Hachioji (JP); Yasuaki Sugimoto, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 201 days.

(21) Appl. No.: 12/847,029

(22) Filed: Jul. 30, 2010

(65) Prior Publication Data

US 2011/0032567 A1 Feb. 10, 2011

(30) Foreign Application Priority Data

Aug. 6, 2009 (JP) ................................. 2009-183724

(51) Int. Cl.
*G06K 15/00* (2006.01)
(52) U.S. Cl. ..................... 358/1.14; 358/1.15; 358/1.16; 726/24
(58) Field of Classification Search .................. None
See application file for complete search history.

(56) References Cited

U.S. PATENT DOCUMENTS

| 7,571,481 | B2 * | 8/2009 | Shimizu ........................... 726/24 |
| 8,018,616 | B2 * | 9/2011 | Kadota ......................... 358/1.15 |
| 2003/0048468 | A1 * | 3/2003 | Boldon et al. ............... 358/1.14 |
| 2004/0230318 | A1 * | 11/2004 | Shimizu ........................... 700/1 |
| 2005/0071495 | A1 * | 3/2005 | Kadota ......................... 709/232 |
| 2005/0177720 | A1 * | 8/2005 | Katano ......................... 713/165 |
| 2005/0177748 | A1 * | 8/2005 | Katano ......................... 713/201 |
| 2006/0262416 | A1 | 11/2006 | Lee et al. |
| 2007/0195358 | A1 | 8/2007 | Imai |
| 2008/0040803 | A1 * | 2/2008 | Ehara ............................. 726/24 |
| 2009/0307774 | A1 * | 12/2009 | Shimizu ......................... 726/23 |
| 2010/0271663 | A1 * | 10/2010 | Kadota ........................ 358/1.15 |

FOREIGN PATENT DOCUMENTS

| JP | A 2004-178559 | 6/2004 |
| JP | 2004-259060 | 9/2004 |
| JP | 2004-302656 | 10/2004 |
| JP | A 2006-323365 | 11/2006 |
| JP | A 2007-220007 | 8/2007 |
| JP | A 2009-222732 | 1/2010 |

* cited by examiner

*Primary Examiner* — Twyler Haskins
*Assistant Examiner* — Nicholas Pachol
(74) *Attorney, Agent, or Firm* — Finnegan, Henderson, Farabow, Garrett & Dunner, L.L.P.

(57) ABSTRACT

A job processing system including; an operation section accepting an operation of setting of job; a generate section generating a job data based on a setting information related to the setting of the job which accepted a setting completion in the operation section; a first storage section storing the generated job data; an execution section executing the job based on the job data; a detection section detecting computer viruses within the job processing system; and, a control section deciding necessity of the detection based on the job data related to the job.

33 Claims, 18 Drawing Sheets

FIG. 4

| RAM REMAINING USAGE AMOUNT (GByte) \ CPU REMAINING USAGE AMOUNT (GHz) | 2.5 OR MORE | 2.4 - 2.0 | 1.9 - 1.5 | 1.4 - 1.0 | LESS THAN 1.0 |
|---|---|---|---|---|---|
| 2.5 OR MORE | DETAILED DETERMINATION | DETAILED DETERMINATION | DETAILED DETERMINATION | DETAILED DETERMINATION | SIMPLE DETERMINATION |
| 2.4 - 2.0 | DETAILED DETERMINATION | DETAILED DETERMINATION | DETAILED DETERMINATION | DETAILED DETERMINATION | SIMPLE DETERMINATION |
| 1.9 - 1.5 | DETAILED DETERMINATION | DETAILED DETERMINATION | DETAILED DETERMINATION | SIMPLE DETERMINATION | SIMPLE DETERMINATION |
| 1.4 - 1.0 | DETAILED DETERMINATION | SIMPLE DETERMINATION | SIMPLE DETERMINATION | SIMPLE DETERMINATION | SIMPLE DETERMINATION |
| LESS THAN 1.0 | SIMPLE DETERMINATION | SIMPLE DETERMINATION | SIMPLE DETERMINATION | SIMPLE DETERMINATION | SIMPLE DETERMINATION |

| RAM REMAINING USAGE AMOUNT (%) \ CPU REMAINING USAGE AMOUNT (%) | 70% OR MORE | 69-50% | 49-40% | 39-30% | LESS THAN 30% |
|---|---|---|---|---|---|
| 70% OR MORE | DETAILED DETERMINATION | DETAILED DETERMINATION | DETAILED DETERMINATION | DETAILED DETERMINATION | SIMPLE DETERMINATION |
| 69-50% | DETAILED DETERMINATION | DETAILED DETERMINATION | DETAILED DETERMINATION | DETAILED DETERMINATION | SIMPLE DETERMINATION |
| 49-40% | DETAILED DETERMINATION | DETAILED DETERMINATION | DETAILED DETERMINATION | SIMPLE DETERMINATION | SIMPLE DETERMINATION |
| 39-30% | DETAILED DETERMINATION | DETAILED DETERMINATION | SIMPLE DETERMINATION | SIMPLE DETERMINATION | SIMPLE DETERMINATION |
| LESS THAN 30% | SIMPLE DETERMINATION | SIMPLE DETERMINATION | SIMPLE DETERMINATION | SIMPLE DETERMINATION | SIMPLE DETERMINATION |

THE FOLLOWING JOB(S) WAS DELETED BECAUSE
A VIRUS WAS DETECTED

| MODE | STATUS AT THE TIME OF DELETING | USER | DATE AND TIME OF JOB CREATION |
|---|---|---|---|
| COPYING | AWAITING EXECUTION | YAMADA | 2009/1/1 13:00 |
| FAX | BEFORE QUEUE REGISTRATION | SUZUKI | 2009/1/1 13:02 |

JOB PROCESSING SYSTEM AND IMAGE PROCESSING APPARATUS

RELATED APPLICATION

The present application is based on Patent Application No. 2009-183724 filed at the Japan Patent Office on Aug. 6, 2009 and which is hereby incorporated herein in its entirety.

TECHNICAL FIELD

The present invention relates to job processing systems that carry out detection of computer viruses inside that system carrying out job processing, and to image processing apparatuses in such job processing systems.

BACKGROUND

The multifunction peripherals in recent years very often use computers (including personal computers) in which are installed general purpose operating systems as control systems, and are compatible with networks. Due to such adapting to PCs, the danger of multifunction peripherals to be infected by computer viruses is becoming high and the possibility of spreading the infection to other equipment is increasing, and antivirus measures are being taken.

For example, since very often a computer virus shows the behavior of spreading the infection to external terminals or severs, etc., there are technologies in which the presence or absence of virus infection is detected based on the operation of the multifunction peripheral communicating with the outside. In detailed terms, the control system inside the multifunction peripheral monitors the periodicity of communication with an external apparatus, detects abnormal communication operation by comparing the communication periodicity with a threshold value set in advance, decides that there is infection by a computer virus if the communication periodicity exceeds the threshold value, and carried out that detection as well as removal of viruses (see Unexamined Japanese Patent Application Publication No. 2004-302656).

In the method of detecting the presence or absence of virus infection by monitoring the actual operation as described above, if the multifunction peripheral is already infected, it operates in the infected state, and hence it is possible that damage is caused by the computer virus. For example, in the method of detecting by comparing the communication periodicity with a threshold value, even when the multifunction peripheral is in the infected state, since communication is carried out without detecting the virus until the communication periodicity exceeds the threshold value, when the communication periodicity exceeds the threshold value and virus infection is detected, it is likely that already infected data has been transmitted and the infection is spread. Therefore, with this technology, the virus countermeasure is not sufficient.

Further, when a virus check is made by a program, the method of pattern matching, etc., is very common in which the characteristic part within the virus code taken out as a pattern and is built up as a database, and the data stored in the storage region (the virus check target data) is compared with the database thereby finding out computer viruses.

However, in embedded equipment such as the above multifunction peripheral, unlike a general purpose personal computer, the resources such as the CPU (Central Processing Unit) or the memory are not plentiful due to cost reduction. If virus scan is executed by a virus checking program having a high processing load during job processing or during user operation, the processing speed decreases substantially. Because of this, it is difficult to carry out virus checks periodically and frequently irrespective of the processing due to jobs or user operations, and when infected by a computer virus, detecting that is likely to be delayed.

Therefore, in embedded equipment, a technology is desired that carries out virus checks efficiently, in which virus checking is not carried out periodically and frequently irrespective of the presence or absence of virus infection, but detection is made of the likelihood of virus infection without obstructing the processing, and also, before any damage occurs due to computer viruses, and virus check is made at appropriate timings.

Further, not only in embedded equipment, but also in job processing apparatuses in which the resources are relatively plentiful, since the processing (performance) is likely to get reduced if the virus check program is executed, similarly it is desirable that it is possible to execute virus checks in an efficient manner.

The present invention was made for solving the above problem, and an object of the present invention is to provide a job processing system and an image processing apparatus in which it is possible to determine, without obstructing the processing and before any damage is done by a computer virus, whether or not a virus check is necessary.

SUMMARY (1) To achieve at least one of the abovementioned objects, a job processing system reflecting one aspect of the present invention comprising;

an operation section accepting an operation of setting of job;

a generate section generating a job data based on a setting information related to the setting of the job which accepted a setting completion in the operation section;

a first storage section storing the generated job data;

an execution section executing the job based on the job data;

a detection section detecting computer viruses within the job processing system; and, a control section deciding necessity of the detection based on the job data related to the job.

(2) In the abovementioned job processing system of item 1, wherein the job data related to the job is a job data related to a job before it is executed by the execution section.

(3) In the abovementioned job processing system of item 1, wherein, the control section decides that the detection by the detection section is necessary, when an abnormality is sensed based on the job data; and, the detection section carries out the detection when the abnormality is sensed.

(4) In the abovementioned job processing system of item 3, a second storage section stores the settings information upon accepting a settings completion in the operation section, wherein the control section carries out the decision of whether or not the detection is necessary based on a result of comparing the job data stored in the first storage section and the settings information stored in the second storage section, and senses the abnormality when the result of the comparison is not matching.

(5) In the abovementioned job processing system of item 4, wherein the settings of job comprises a setting of the operation mode indicating a type of job; and, the control section carries out the comparison in the operation mode of the job data and in the operation mode of the settings information.

(6) In the abovementioned job processing system of item 4, wherein, the comparison comprises, a first comparison of comparing a prescribed number of data included in the job data and a prescribed number of information corresponding to the prescribed number of data included in the settings information, and a second comparison of comparing a larger number of data than the prescribed number included in the job data and a larger number of information corresponding to the larger number of data included in the settings information, and wherein the control section determines based on a prescribed condition whether to carry out the first comparison or the second comparison.

(7) In the abovementioned job processing system of item 6, wherein the prescribed conditions comprises a margin of resources used for making a decision of whether or not the detection is necessary at a point of time when the determination is made, and, the control section determines whether to carry out the first comparison or the second comparison based on the margin of resources.

(8) In the abovementioned job processing system of item 7, wherein the margin of resources is constituted from at least one of the remaining amount of usage of the resources and the remaining usage ratio of the resources.

(9) In the abovementioned job processing system of item 6, wherein the prescribed conditions comprises the settings information at the time of accepting the settings completion; and, the control section determines whether to carry out the first comparison or the second comparison based on the settings information at the time of accepting the settings completion.

(10) In the abovementioned job processing system of item 6, wherein the settings of job comprises settings of an operation mode indicating the type of job; and, the operation mode is comprised in the data and the information compared by the first comparison and by the second comparison.

(11) In the abovementioned job processing system of item 10, wherein, when the control section determines to carry out the first comparison, only the prescribed number of information including the operation mode in the settings information accepted at the time of settings completion of the job is stored in the storage section.

(12) In the abovementioned job processing system of item 3, wherein, the control section carries out the decision of whether or not the detection is necessary based on whether or not the job data is the job data that is generated upon accepting the settings completion, and, the abnormality is detected when the job data is determined that it is not a job data generated upon accepting settings completion.

(13) In the abovementioned job processing system of item 12, wherein, the control section measures the time elapsed from an instant of time of accepting the settings completion, and, determines that the job data generated after a prescribed time has elapsed from the instant of time of accepting the settings completion is not the job data that is generated upon accepting the settings completion.

(14) In the abovementioned job processing system of item 12, wherein, setting of the operation mode indicating the type of job is comprised in the settings of jobs, and, the control section determines that job data generated in the state in which the operation mode is not stored in the settings information in the second storage section is not a job data generated upon accepting the settings completion.

(15) In the abovementioned job processing system of item 5, wherein, the operation mode is selected and set upon accepting a selection operation in the operation section during the settings of job, and, the selected and set operation mode is stored to the second storage section as the operation mode of the settings information.

(16) In the abovementioned job processing system of item 5, wherein, in the settings of job, a plurality of types of setting modes provided for each of the operation modes are changed by accepting the operation mode selection operations in the operation section, and the settings are accepted in a setting mode corresponding to the switched operation mode, and, the setting mode at the time of generating the job data is stored as the operation mode to the second storage section.

(17) In the abovementioned job processing system of item 3, wherein, the control section carries out the decision of whether or not detection is necessary based on a data value included in the job data, and detects the abnormality when the data value is above a prescribed threshold value.

(18) In the abovementioned job processing system of item 17, wherein, the job includes a print job; and, the job data related to the print job includes the number of copies as the data value.

(19) In the abovementioned job processing system of item 17, wherein, the job includes a transmission job, the job data related to the transmission job includes the number of transmission destinations as the data value.

(20) In the abovementioned job processing system of item 19, wherein, the control section checks whether or not there is a job under execution by the execution section after determined that the detection is necessary by the detection section and, when there is a job under execution, does not allow the detection section to carry out the detection until the execution of that job completion.

(21) In the abovementioned job processing system of item 20, wherein, when it is decided that the detection is necessary by the detection section, the control section further checks whether or not there is also a job waiting for execution by the execution section, and when there is also a job waiting for execution, after the completion of execution of a job currently under execution, temporarily suspends the execution of the job waiting for execution and causes the detection to be executed by the detection section.

(22) In the abovementioned job processing system of item 1, wherein, job settings includes a timer setting of a job execution starting and the control section decides that the detection is not necessary, in the decision of whether or not the detection is necessary based on a job data which the timer is set.

(23) In the abovementioned job processing system of item 1, wherein, the control section decides that the detection is not necessary in the decision of whether or not the detection is necessary based on the job data related to a type of job for which it is not possible to accept settings from the operation section.

(24) An image processing apparatus included in a job processing system of claim 1, reflecting one aspect of the present invention and executes the jobs as jobs for image data, and is provided with the operation section, the storage section, the execution section, and the control section;

wherein the control section requests the detection section to detect computer viruses inside of the image processing apparatus, when the control section decided that detection by the detection section is necessary.

BRIEF DESCRIPTION OF THE DRAWINGS

FIG. 4 is a diagram showing the construction of the management table for determining, based on the amount of use of the resources in the multifunction peripheral, whether to carry out the simple or the detailed process of making the decision of whether or not a virus check is necessary.

FIG. 5 is a diagram showing the construction of the management table for determining, based on the ratio of use of the resources in the multifunction peripheral, whether to carry out the simple or the detailed process of making the decision of whether or not a virus check is necessary.

FIG. 15 is a diagram showing a job deleting notification screen displayed in the display section of a multifunction peripheral.

DETAILED DESCRIPTION OF THE PREFERRED EMBODIMENT

Some preferred embodiments of the present invention are described below with reference to the drawings.

First Preferred Embodiment

Figure 1:
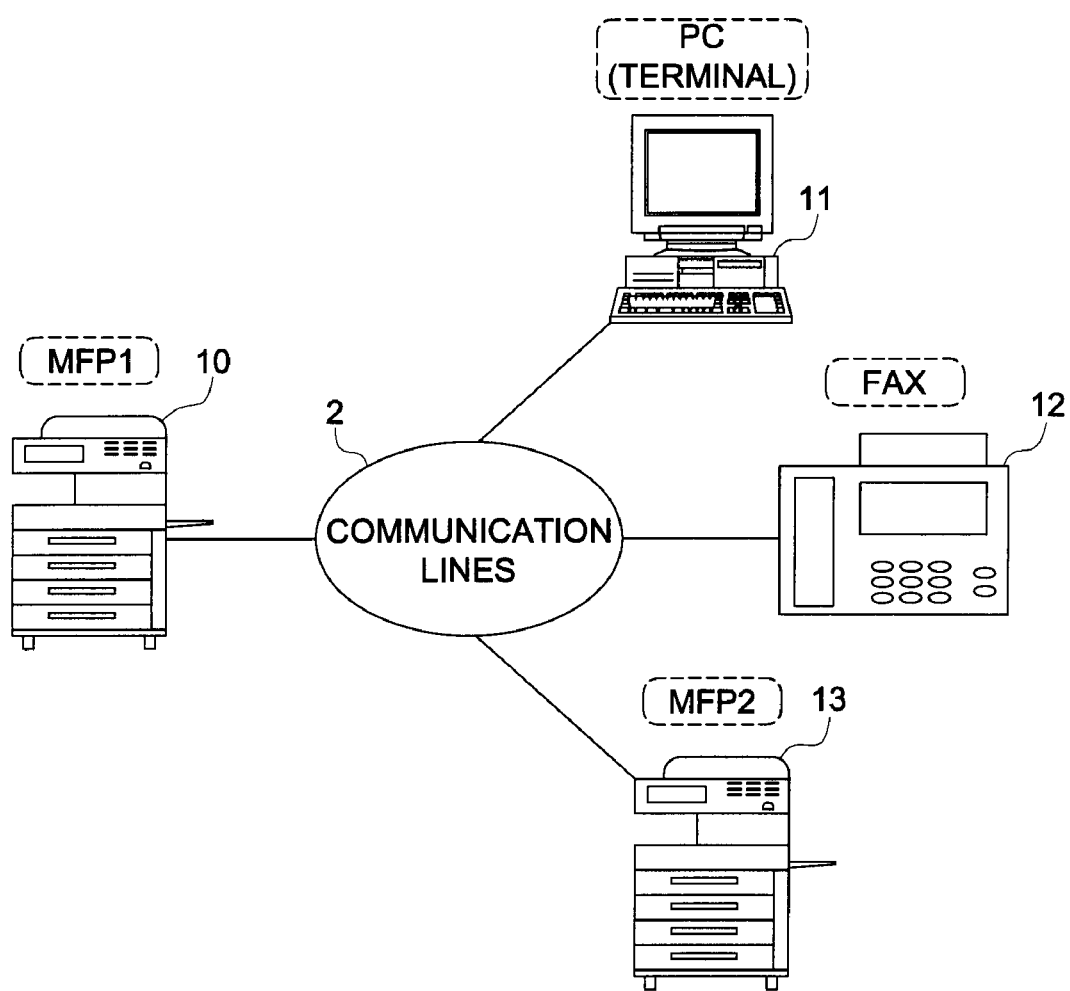
FIG. 1 is an overall configuration diagram showing the outline configuration of all of the multifunction peripheral as an image processing apparatus according and other equipment connected via communication lines to a first preferred embodiment of the present invention.

FIG. 1 is an overall configuration diagram showing the outline configuration of all of a multifunction peripheral (Multi Function Peripheral/Multi Function Printer, MFP) 10 as an image processing apparatus according to a first preferred embodiment of the present invention and other equipment (external apparatuses) connected via communication lines 2. The other equipment is a terminal 11 constituted by a personal computer (PC), a facsimile machine 12, and other multifunction peripherals, etc. The multifunction peripheral 10 (MFP1) connected to the communication lines 2 and the other equipment (PC, FAX MFP2, etc.) can carry out mutual communication via the communication lines 2.

The multifunction peripheral 10 is provided with the copying function of optically reading out the images of an original document and printing and outputting the copied images on a recording sheet, the scanning function of storing in a file or of transmitting to a terminal 11 or a server the image data of the read out original document, the printer function of printing and outputting on a recording sheet the image corresponding to the print data received from a terminal 11 or the image corresponding to the image data stored in that multifunction peripheral 10, the facsimile function of transmitting and receiving image data (in concrete terms, facsimile data) with a facsimile machine 12 or another multifunction peripheral 13, the email function of transmitting and receiving emails with image data attached to the email to and from external apparatuses, and the box function of storing various types of image data in boxes which are storage areas acquired for data storage (a box uses the folder function of a general purpose operating system), and other functions. The different types of image data stored in boxes can be scan data, print data, received facsimile data, or image data attached to emails, the image data input by connecting an external storage apparatus such as a USB (universal serial bus) memory, etc. Further, in the facsimile function is provided the timer function (timer job execution function) of setting using a timer the time of executing facsimile transmission.

Further, the multifunction peripheral 10 has the function of accepting from the user the operations in an operation panel of job settings and completion of settings of a job (execution instruction) through the above different functions, and the function of selection of the operation mode in the settings of a job and of the settings related to various types of parameters related to that selected operation mode. The "operation mode" is a mode indicating the type of job (the highest category). Here, the modes are that of copying, scanning, printing, facsimile, and box, etc.

In addition, the multifunction peripheral 10 has the function of continually retaining individual information indicating the operation modes set (selected) successively during the process of setting the job by the user or the set values of different items, and of confirming the contents of settings of that job when the settings completion operation is received and storing the settings information retained at the time of settings completion, the function of generating and storing the job data based on the settings information retained at the time of settings completion (at the time of confirming the contents of settings), the function of executing a job based on the job data for the job data generated by these user operations or the job data input from an external apparatus, and the function of storing the history information of jobs. The "settings information" is the information that specifies the processing conditions of the job according to the contents of settings made by user operations (contents of operations).

A job due to user operations (a job selecting the operation mode) is a copying job, a scanning job, a print job of printing out the image data in an external storage apparatus connected inside the multifunction peripheral 10, a facsimile transmission job, a box job, etc. A job input from an external apparatus is a print job (a PC print job) requested by receiving the print data from a terminal, etc., or a facsimile reception job, etc.

In addition, the multifunction peripheral 10 is provided with the function of detecting a computer virus present inside itself, the function of deciding whether or not a virus check is necessary based on the job data before the job is executed, when an abnormality is detected based on the job data during this decision of whether or not a virus check is needed, the function of deciding that a virus check is necessary and executing that virus check.

Further, in making the decision of whether or not a virus check is necessary, sometimes the decision of whether it is required or not required is made based on the result (matching or not matching) of comparing the generated job data and the stored settings information. The two methods of comparison of simple comparison (the first comparison) and detailed comparison (the second comparison) have been provided as the method of this comparison, and which of the two methods of comparison is to be used is decided based on the apparatus setting (the default setting) or a table (the management table) (selection control of comparison method).

Figure 2:
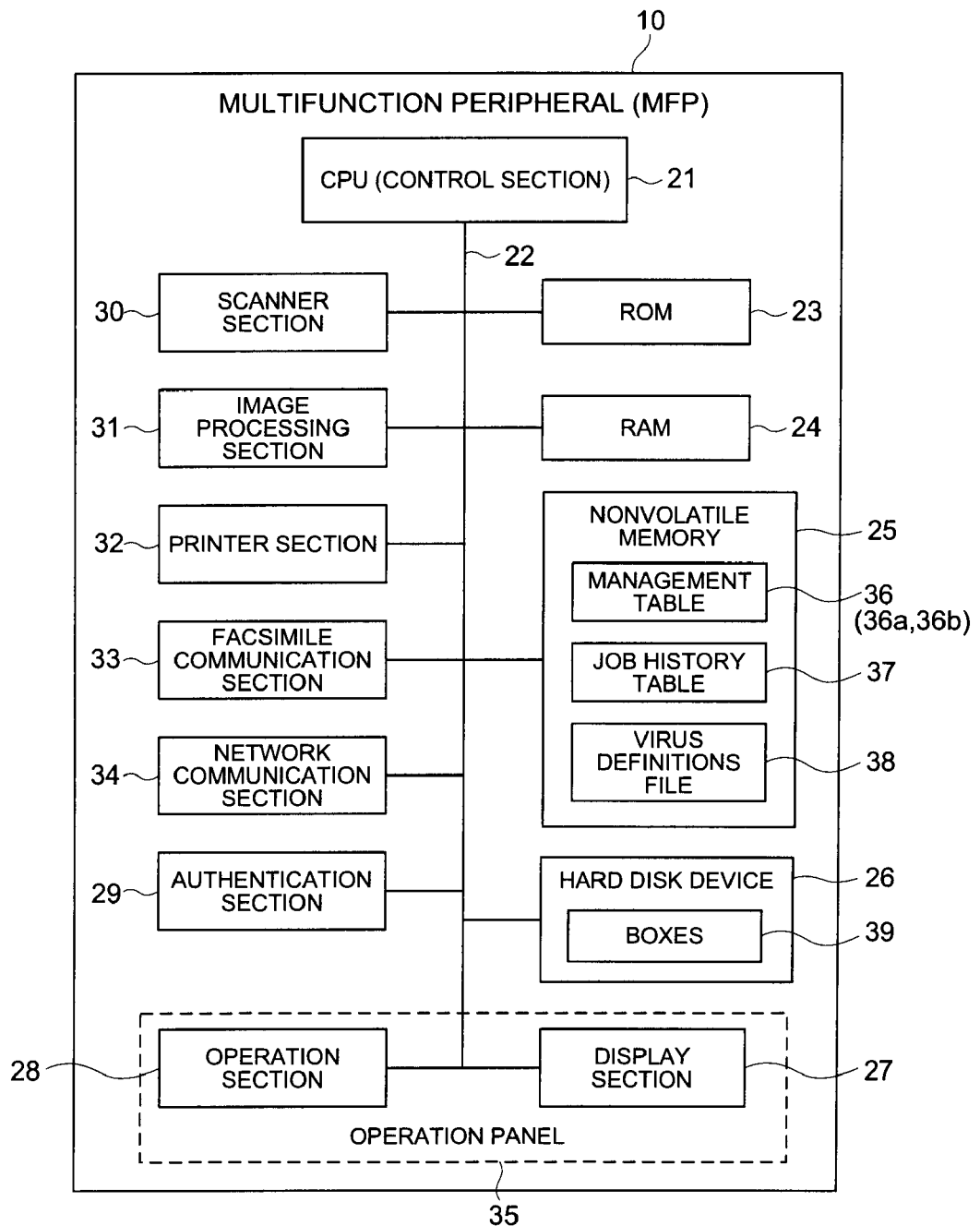
FIG. 2 is a block diagram showing the outline configuration of the multifunction peripheral.

FIG. 2 is a block diagram showing the outline configuration of the multifunction peripheral 10. The multifunction peripheral 10 has a CPU (Central Processing Unit) 21 as the control section to which are connected via a bus 22, a ROM (Read Only Memory) 23, a RAM (Random Access Memory) 24, a nonvolatile memory 25, a hard disk device 26, a display section 27, an operation section 28, an authentication section 29, a scanner section 30, an image processing section 31, a printer section 32, a facsimile communication section 33, and a network communication section 34.

The CPU 21 controls the operations of the multifunction peripheral 10 according to the programs stored in the ROM 23. The RAM 24 is not only used as a working memory for temporarily storing various types of data at the time that the CPU 21 executes the programs, but is also used as an image memory that temporarily stores image data.

The nonvolatile memory 25 is a rewritable memory whose stored contents are retained even when the power supply to it has been switched off and stores information unique to the apparatus or various types of settings information, user authentication information, data for the display of various types of screens displayed in the display section 27, the management table 36 (see FIG. 4 36a and FIG. 5 36b) which is referred to at the time of deciding the method of comparing the job data and the settings information, the job history table 37, the virus definitions file 38, etc. The hard disk device 26, apart from storing various types of saved data, stores the image data obtained by reading the original document during scanning or copying, or the print data (image data) included in a print job received from and requested by a terminal 11, the received facsimile data or the image data attached to a received email, or the image data input by connecting an external storage apparatus. In the hard disk device 26 are provided some boxes 39 for storing these different types of image data Further, it is also possible to store the management table 36, the job history table 37, the virus definitions file 38, etc., in the hard disk device 26 and not in the nonvolatile memory 25.

In the job history table 37 are stored various types of history information related to the history of jobs, and the stored history information is used in the information display, etc., in notification screens (see FIG. 15) to be described later. The history information stored in the job history table 37, in the case of a job input by user operations, for example, is the user ID (also called the user name) of an authenticated user who made the settings for the job and instructed its execution, the job ID issued by the CPU 21 upon accepting the job execution instruction, the job preparation date and time, the job status (before cue registration/execution waiting/execution/end by error/deletion) and the job settings information, etc. Regarding the job settings information, it is also possible to store the settings information for all the items including the operation mode, or else it is also possible to store the settings information for a part of the items including at least the operation mode. These history information items are stored in a job history table 37 for each job with correspondence established with each job.

The virus definitions file 38 is used for detecting computer viruses, and is a file recording the features (characteristic patterns) of computer viruses (also called a pattern file). The virus definitions file 38 is continually updated by the multifunction peripheral 10 accessing a dedicated server.

The display section 27 is configured using a liquid crystal display (LCD), etc., and displays various types of screens such as operation screens, settings screens, confirmation screens, notification screens, etc. The operation section 28 is constructed to have various types of keys such as a mode selection key for selecting the operation mode (job type) of the job to be set, a start key, a stop key, a cancel key, ten keys, etc., and a touch panel that is provided on the surface of the liquid crystal display and that detects the coordinates of the position where it is pressed, and accepts the different types of operations made by the user on the multifunction peripheral 10. This display section 27 and the operation section 28 are provided in the operation panel 35 of the multifunction peripheral 10.

The authentication section 29 has the function of recognizing (identifying) the users by comparing, etc., the authentication information input by the user with the user authentication information for collation that has been stored in the multifunction peripheral 10.

The scanner section 30 carries out the function of obtaining the image data by optically reading out an original document. The scanner section 30 is configured to be provided with, for example, a light source that emits light onto an original document, a line image sensor that receives the light reflected from the document and reads out one line part of the document in the width direction, a movement means that successively moves the reading position in units of a line along the length direction of the document, an optical path that is made of lenses, mirrors, etc., and that guides the light reflected from the document to the image sensor and forms an image, and a conversion section that converts the analog image signal output by the line image sensor into digital image data, etc.

The image processing section 31 is provided with functions that carry out rasterizing processing on the print data (print data in the vector format) received from a terminal 11, or carrying out various types of image processing such as image correction, rotation, enlarging or reducing, compression or decompression, etc., on the image data.

The printer section 32 carries out the function of printing out in a recording sheet the images based on the image data using an electro-photographic process. The printer section 32, for example, is configured to have a conveying unit for recording sheets, a photoreceptor drum, a charging unit, a laser diode (LD) whose turning ON is controlled according to the image data that is input, a scanning unit that scans the laser light beam emitted by the laser diode (LD) on the photoreceptor drum, a developing unit, a transfer and separating unit, a cleaning unit, and a fixing unit, as a so called laser printer. This printer section can also be an LED printer in which the photoreceptor drum is scanned by an LED (Light Emitting Diode) instead of a laser light, or else, it can also be a printer of some other method.

The facsimile communication section 33 carries out transmission and reception of image data with an external apparatus provided with the facsimile function via public communication lines (communication lines 2). The network communication section 34 carries out communication with external apparatuses via a network (communication lines 2) such as a LAN (Local Area Network), etc.

Figure 3:
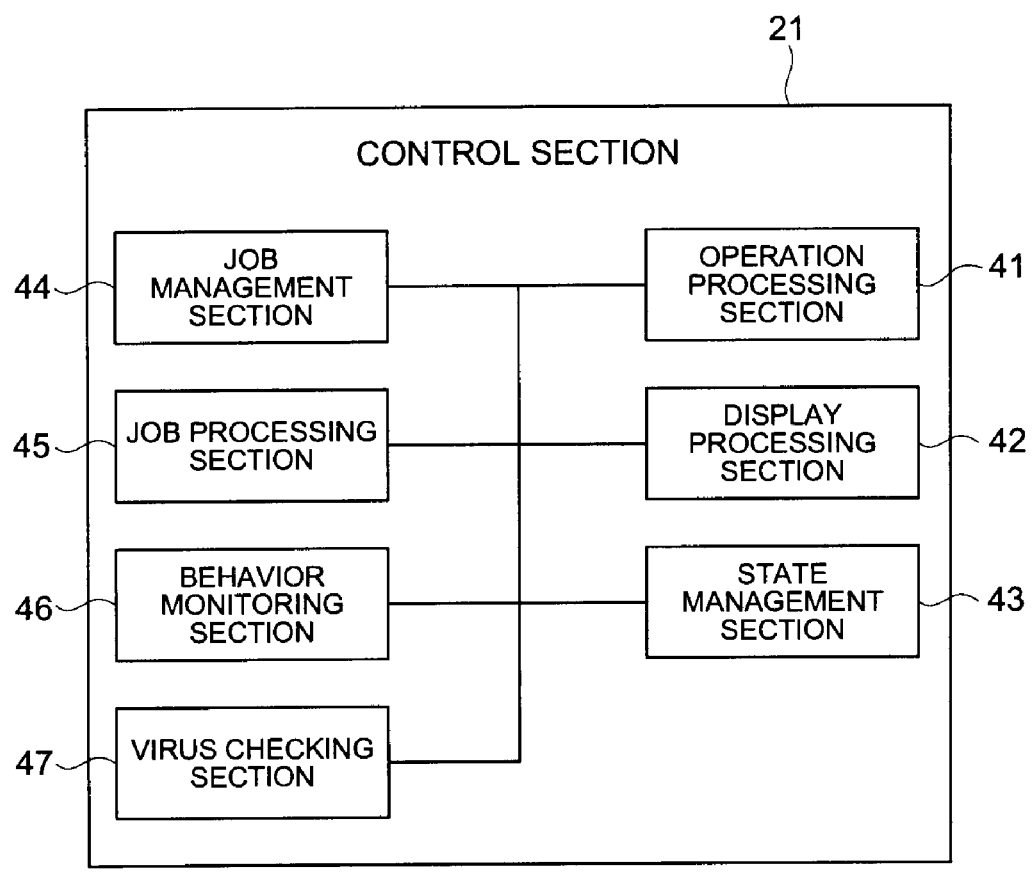
FIG. 3 is a functional block diagram showing the functional organization of the control section in a multifunction peripheral.

FIG. 3 is a functional block diagram showing the functional configuration of the CPU 21 functioning as a control section. The control section (CPU 21) is provided with various types of functional sections such as an operation processing section 41, a display processing section 42, a state management section 43, a job management section 44, a job processing section 45, a behavior monitoring section 46, and a virus checking section 47, etc.

The operation processing section 41 has the function of carrying out processing corresponding to the operations accepted from the operation section 28 (the processing related to the operations). The display processing section 42 has the function of carrying out the processing related to screen display in the display section 27. The state management section 43 has the function of carrying out the management (apparatus status management) related to the state of the multifunction peripheral 10. The job management section 44 has the function of carrying out management related to jobs (job status management). The job processing section 45 has the function of carrying out processings related to the jobs.

In detailed terms, the operation processing section 41, when an operation of pressing the mode selection key (copy, scan, print, facsimile, box, etc.) in the operation panel 35 is accepted, inputs the information indicating the pressed (selected) operation mode to the state management section 43. The state management section 43 changes the state of the operation panel 35 to the state of accepting the settings related to a job in the operation mode indicated by the information that has been input. In other words, it changes the state to that of accepting the settings for the selected job type (the settings mode for each job type). This state of the operation panel 35 is called the "panel mode". A plurality of types of panel modes is provided for each operation mode.

Further, among the panel modes, apart from the panel modes related to the setting of jobs, various types of panel modes for operations are also provided such as a panel mode for accepting the settings of the apparatus itself (the apparatus settings panel mode), a panel mode displayed in the initial screen (the default panel mode), the panel mode in which the operations of user authentication, etc., are accepted (the user authentication panel mode), etc.

Further, the state management section 43 inputs operation instructions to the display processing section 42 and the operation processing section 41 so that the operations are made in the changed panel mode. Upon accepting these, the display processing section 42 displays the settings screen corresponding to that panel mode (the operation mode) in the display section 27. For example, screen displays are made such as, the copy settings screen is displayed when copying is selected as the operation mode, the scan settings screen is displayed when scanning is selected as the operation mode, the print settings screen is displayed when printing is selected as the operation mode, the facsimile settings screen is displayed when facsimile is selected as the operation mode, and the box settings screen is displayed when box is selected as the operation mode, etc. The operation processing section 41 makes the ten keys or the soft keys displayed in the settings screen (touch panel), etc., operate as the operation section for accepting the settings related to that panel mode (operation mode). The operation panel 35, for each of these panel modes, operates so as to accept the settings of the different items of a job in the operation corresponding to the panel mode.

For the different types of items, for example, in a copy job or a print job input by a user operation, settings are accepted for items such as the number of copies to be printed out, etc. In a scan job and a box job, it is possible to attach the image data to an email and transmit it, and the transmission settings of that email or the setting of a plurality of destinations are accepted. In a facsimile transmission job, the settings of a plurality of destinations (broadcast transmission) or the timer setting of transmission, etc., are accepted. Further, it is also possible to have a configuration in which instead of the time of transmission in a timer setting, it is possible to set the time to elapse from the time of making the setting.

In the settings of jobs for each of these panel modes (for each of the operation modes), when the CPU 21 accepts the settings of the different types of items from the user via the operation panel 35, stores the settings information stipulating the job processing conditions according to the contents of those settings. In detailed terms, every time a setting of the different types of items is accepted via the operation panel 35, various individual information items (settings information) indicating the set values of that item are stored as when they are input.

When the pressing operation by the user of the Start key in the operation panel 35 is accepted, the CPU 21 establishes the contents of settings for the job and stores the settings information retained at the time of completing the settings. For example, the settings information is stored in the working memory area of the RAM 24 or in the nonvolatile memory 25, etc. Further, based on the settings information retained at the time of settings completion (at the time that the contents of settings are established), the job data is generated by CPU 21 as a generate section and stored in the data format for control including the processing conditions office job according to the contents of the settings (the set values of the operation mode and of the different items). For example, the job data is stored in the working memory area of the RAM 24 or in the nonvolatile memory 25, etc.

In the case of a job for which a timer setting has been made (that is, a timer job), data indicating the time of turning ON the timer or of transmitting (or the specified time to elapse from the time of making the setting) is added to the job data, or else, is stored as an extended information of the job data. Further, the CPU 21 issues a job ID for identifying that job data (or job).

The job management section 44, when the generated job is a non-timer job, issues a request to add the job immediately after its generation to the job queue, if it can be registered or as soon as it becomes possible to register it, the generated job (job ID) is registered in the job queue and managed. If the generated job is a timer job, the generated job (job ID) is temporarily registered in a timer job execution list and managed, and a request to add the job to the job queue is made when the transmission time is reached (or when the specified time has elapsed after the time of its setting), a request is issued to add the job immediately after its generation to the job queue, if it can be registered or as soon as it becomes possible to register it, the job (job ID) from the timer job execution list is registered in the job queue and managed.

The job processing section 45 carries out the job processing based on the job data as soon as the job registered in the job queue becomes executable (basically in the sequence in which they are registered). A job processing includes, for example, the controls, etc., of the different sections of the multifunction peripheral 10 (the different blocks in FIG. 2) for making them operate in order to execute the job under the processing conditions included in the job data. The targets of control, for example, are the scanner section 30, the image processing section 31, the printer section 32, the facsimile communication section 33, the network communication section 34, and the hard disk device 26, etc. (the job execution section).

The behavior monitoring section 46 not only monitors the behavior of the different sections of the multifunction peripheral 10 related to the job processing, but also carries out the function of determining whether or not a virus check is necessary based on the job data related to a job before execution. When it is determined that a virus check is necessary, a virus check execution request is input to the virus checking section 47. The virus checking section 47 has the function of executing a virus check using the virus definitions file 38 and following the virus checking program when it accepts the virus check execution request from the behavior monitoring section 46.

Further, the CPU 21 is provided with the function of executing virus removal following a virus removal program when a computer virus is detected during a virus check by the virus checking section 47. It is also possible to configure so that this virus removal is executed by the virus checking section 47.

Next, the management table is explained that is referred to at the time of determining the method of comparison of the job data and the settings information during the determination of whether or not a virus check is required.

FIG. 4 and FIG. 5 show examples of the management table 36 (36a and 36b). In a multifunction peripheral 10 according to the present preferred embodiment, as the mode of determining whether or not a virus check is required, there is a "simple determination" of comparing in a simple manner the generated job data and the stored settings information, and a "detailed determination" of comparing them in detail. The simple determination is a determination mode in which the comparison is made of only the operation mode of the job data and of the settings information. The detailed determination is a determination mode in which all the contents of the job data and of the settings information are compared.

This mode of determining whether or not a virus check is required can be specified by the user to be "fixed" to either the simple determination mode or the detailed determination mode, or can be specified to be "select" in which case the selection is made automatically (apparatus setting). The setting information of this "fixed" or "select" related to the mode of determining whether or not a virus check is required is stored in the nonvolatile memory 25. In the case of "fixed", the multifunction peripheral 10 decides the mode of determining whether or not a virus check is needed as the simple determination mode or the detailed determination mode as specified by the user. In the case of "select", the multifunction peripheral 10 refers to the management table 36, and decides the mode of determining whether or not a virus check is needed as the simple determination mode or the detailed determination mode based on the degree of margin of resources. In detailed terms, the simple determination mode is decided upon when the degree of margin of the resources used for determining whether or not a virus check is needed is small (less than a prescribed value) at the time of deciding on the mode of determining whether or not a virus check is needed, and the detailed determination mode is decided upon when that degree of the margin of resources is high (larger than a prescribed value), and the information for making this decision is stored in the management table 36.

In the present preferred embodiment, the targets of resources are the CPU 21 and the RAM 24. It can be configured so that the degree of margin is constituted by the remaining usage amount or the remaining usage ratio of the resources (CPU and RAM). The remaining usage amount is the value of the remaining size of the resources that are not being used by the processing that is currently being executed (remaining usage amount=total resources available−amount of resources used). The remaining usage ratio is the remaining size of the resources that are not being used by the processing that is currently being executed expressed in terms of a ratio (remaining usage ratio=remaining amount of resources/total amount of resources).

When using only the remaining amount, for example, it is possible to determine the mode of determining whether or not a virus check is necessary by stipulating the degree of margin of the resources from the remaining usage amount of the CPU 21 and the remaining usage amount of the RAM 24. When using only the remaining ratio, for example, it is possible to determine the mode of determining whether or not a virus check is necessary by stipulating the degree of margin of the resources from the remaining usage ratio of the CPU 21 and the remaining usage ratio of the RAM 24.

Further, it is also possible to use as the target resource only one of the CPU 21 and the RAM 24. It is also possible to make the configuration such that the remaining amount and the remaining ratio are used together for the degree of margin.

FIG. 4 is a diagram showing an example of the management table 36a which is referred to at the time of determining the mode of determining whether a virus check is necessary or not based on the remaining usage amount of the resources. This is a table in which are stored in the form of a matrix the mode of determining whether or not a virus check is necessary (simple determination or detailed determination) corresponding to different combinations of the remaining usage amount of the CPU 21 (in units of GHz) and the remaining usage amount of the RAM 24 (in units of GBytes). In the item fields along the horizontal direction (in the direction of columns) is stored the remaining amount of CPU 21 usage divided into a plurality of stages, in the item fields in the vertical direction (in the direction of rows) is stored the remaining amount of RAM 24 usage divided into a plurality of stages, and the "simple determination" or the "detailed determination" corresponding to the plurality of types of combinations of these different stages is stored in the table field in the form of a matrix. Here, the simple determination has been assigned for the combinations in which the remaining usage amount of at least one of the CPU 21 and the RAM 24 is a low value (less than a prescribed value), and the detailed determination has been assigned for the combinations in which the remaining usage amount is a high value (equal to or more than a prescribed value).

In concrete terms, the remaining usage amount of the CPU 21 and the remaining usage amount of the RAM 24 are respectively stored as the different stages of "2.5 or more", "2.4 to 2.0", "1.9 to 1.5", "1.4 to 1.0", and "less than 1.0". The detained determination mode has been assigned for the combinations in which both are higher than 1.5 and for the combinations in which one is higher than 1.0 and the other is higher than 2.0 (duplicate combinations present). The simple determination mode has been assigned for all other combinations, that is, for the combinations in which at least one is lower than 1.0, one is lower than 1.5 (≈less than 1.4), and the other is lower than 2.0 (≈less than 1.9) (duplicate combinations present). Further, in the figure, the boundary between detailed determination and simple determination is shown by a broken line.

In the management table 36a, the degree of margin of the resources is expressed by the combination of the remaining usage amount of the CPU 21 and the remaining usage amount of the RAM 24, the simple determination mode has been assigned for the combinations in which the degree of margin is less than a prescribed value, and the detailed determination mode has been assigned for the combinations in which the degree of margin is equal to or higher than a prescribed value.

FIG. 5 is a diagram showing an example of the management table 36*b* which is referred to at the time of determining the mode of determining whether a virus check is necessary or not based on the remaining usage ratio of the resources. This is a table in which are stored in the form of a matrix the mode of determining whether or not a virus check is necessary (simple determination or detailed determination) corresponding to different combinations of the remaining usage ratio of the CPU 21 (%) and the remaining usage ratio of the RAM 24 (%). In the item fields along the horizontal direction (in the direction of columns) is stored the remaining ratio of CPU 21 usage divided into a plurality of stages, in the item fields in the vertical direction (the direction of rows) is stored the remaining ratio of RAM 24 usage divided into a plurality of stages, and the "simple determination" or the "detailed determination" corresponding to the plurality of types of combinations of these different stages is stored in the table field in the form of a matrix. Here, the simple determination has been assigned for the combinations in which the remaining usage ratio of at least one of the CPU 21 and the RAM 24 is a low value (less than a prescribed value), and the detailed determination has been assigned for the combinations in which the remaining usage ratio is a high value (equal to or more than a prescribed value).

In concrete terms, the remaining usage ratio of the CPU 21 and the remaining usage ratio of the RAM 24 are respectively stored as the different stages of "70% or more", "69 to 50%", "49 to 40%", "39 to 30%", and "less than 30%". The detained determination mode has been assigned for the combinations in which both are higher than 40% and for the combinations in which one is higher than 30% and the other is higher than 50% (duplicate combinations present). The simple determination mode has been assigned for all other combinations, that is, for the combinations in which at least one is lower than 30%, one is lower than 40% (≈less than 39%), and the other is lower than 50% (≈less than 49%) (duplicate combinations present). Further, in the figure, the boundary between detailed determination and simple determination is shown by a broken line.

In the management table 36*b*, the degree of margin of the resources is expressed by the combination of the remaining usage ratio of the CPU 21 and the remaining usage ratio of the RAM 24, the simple determination mode has been assigned for the combinations in which the degree of margin is less than a prescribed value, and the detailed determination mode has been assigned for the combinations in which the degree of margin is equal to or higher than a prescribed value.

Next, the operation of the multifunction peripheral is explained here.

When the data, etc., stored inside a multifunction peripheral 10 is infected by a computer virus, it can carry out abnormal operation (behavior) due to that computer virus. For example, it is possible that the job data related to a legal job created by a user is tampered with, or an illegal job (job data) is prepared. In the tampering of job data, it is possible that malicious tampering is made that makes the damage large. For example, it is possible that the operation mode is changed from copying to facsimile transmission, or else, the number of copies to be printed or the number of transmission destinations may be increased by very large amounts. Further, it is also highly possible that such tampered or illegally generated job data are infected by the computer virus.

Here, although a decision is being made as to whether or not a virus check is necessary based on the job data before executing a job, when an abnormality (abnormal behavior) is detected based on the job data, it is possible that there is an infection by a computer virus, and it is being determined that a virus check is necessary and the virus check is being executed. The timing of carrying out the determination of whether or not a virus check is necessary is being taken as immediately after a job is created. In detailed terms, this timing is taken as the timing of registering a created job in the job queue (at the time of issuing a queue registration request).

The target jobs are the jobs created by user operations, and can be copying jobs, scanning jobs, printing jobs (printing out image data inside the multifunction peripheral 10 or the image data from an external apparatus connected to it), facsimile transmission jobs, and box jobs, etc. However, for a facsimile transmission job for which the transmission tinier has been set, since the queue registration request is not issued immediately after the job is generated but it is registered temporarily in the transmission timer execution list, and since the queue registration request is issued when the time set in the timer is reached, this type of job has been excluded from the targets. Further, a job input from an external apparatus (concretely, this is a reception job), for example, a PC print job, or a facsimile reception job, etc., have also been excluded from the targets. However, if the job data or the image data related to the jobs that are excluded from the targets has been stored inside the multifunction peripheral 10, such data will become the target of check at the time that an output processing such as printing, transmission, display, etc., is made of such data.

The detection of abnormality based on the job data related to the target jobs is being carried out by checking the following items.

(1) An abnormality (possibility of job data being tampered with is present) is detected when there is a mismatch in the comparison (simple determination: operation mode only, detailed determination: all items) between the generated job data and the settings information at the time that the job settings completion is accepted.

(2) An abnormality (possibility of job data being tampered with is present) is detected when the data value is above a prescribed value during confirming a data value (number of copies to be printed out or number transmission destinations) included in the job data.

(3) An abnormality (possibility of an illegal job being created is present) is detected when it is found that the settings information (operation mode) has not been stored during the check of whether or not the settings information (operation mode) has been stored.

(4) An abnormality (possibility of an illegal job being created is present) is detected when there is a job data generated after a prescribed time has elapsed during the check of the time elapsed from the instant offline when the settings completion is accepted by a user operation (the timing of job data creation).

Further, since a correspondence has been established between the settings information used for generating the job data and the job data, when a job data is tampered with in an abnormal behavior due to a computer virus, there is the danger that even the settings information itself is tampered with along with that. In view of this, in the operation modes included in the settings information in the above cases of (1) and (3), by storing the panel mode at the time of settings completion as the operation mode, the panel mode having no direct relationship with the job data is being stored as the operation mode. In concrete terms, in (1) the operation mode inside the job data is compared with the panel mode (=operation mode) stored at the time of settings completion, and in (3) whether or not the panel mode (=operation mode) has been stored is confirmed.

Firstly an outline (overall flow) of the determination by the multifunction peripheral 10 of whether or not a virus check is necessary is explained, and the details are explained after that.

Figure 6:
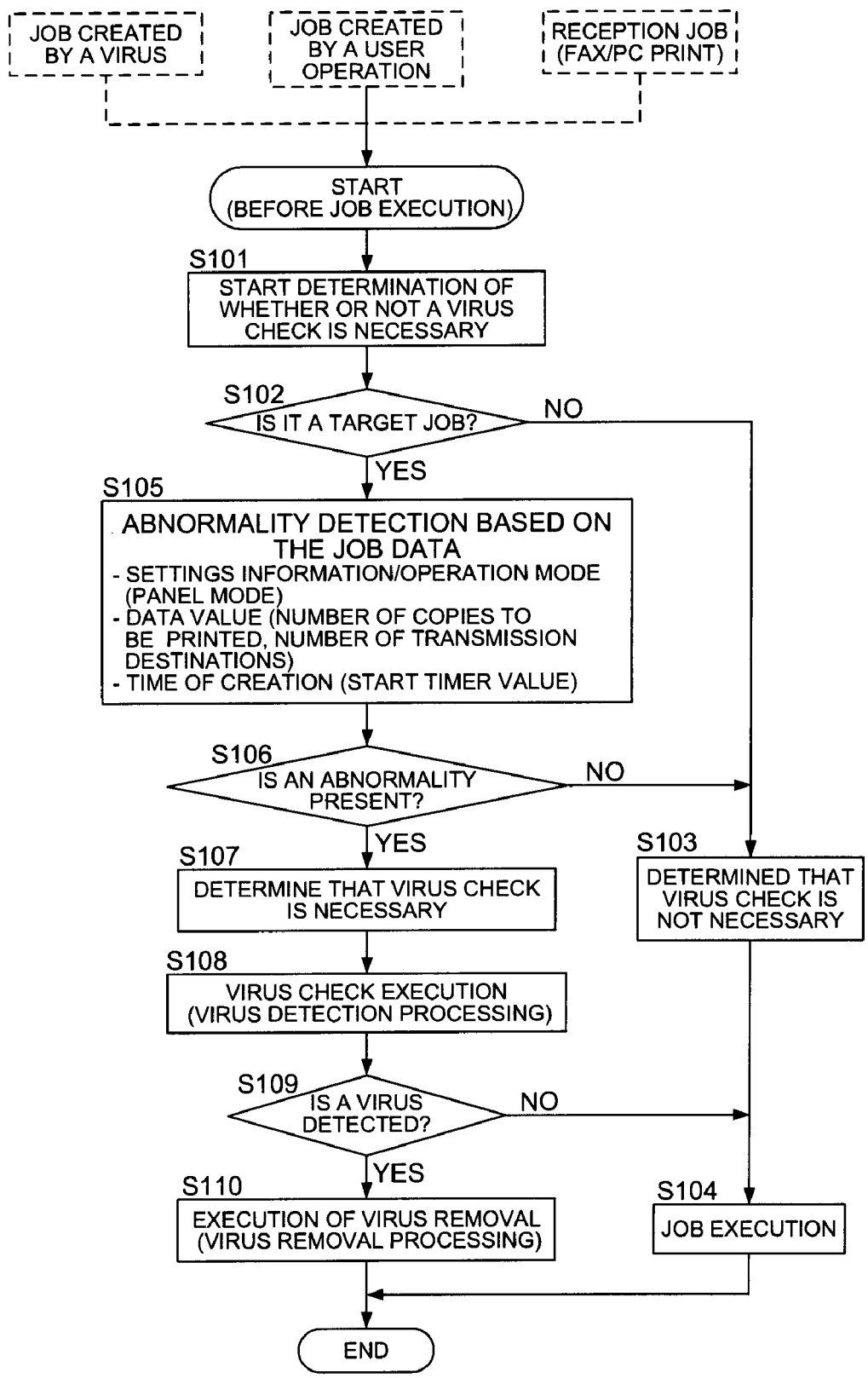
FIG. 6 is a flow chart showing the outline of the operations made by the multifunction peripheral.

FIG. 6 is a diagram showing an outline flow of the operation by the multifunction peripheral 10 of determining whether or not a virus check is necessary.

The multifunction peripheral 10 starts this operation (Start) when a job is created or is received from an external apparatus. A job created by the multifunction peripheral 10 can be, apart from a legal job created due to user operations, when the multifunction peripheral 10 is infected by a computer virus, an illegal job that is created by the computer virus. A reception job can be a facsimile reception job received from a facsimile machine 12, etc., or a PC print job, etc., received from a terminal 11, etc.

The behavior monitoring section 46 (included in the CPU 21), before the execution of a job, starts the determination of whether or not a virus check is necessary (Step S101), and checks whether or not that job is a target (Step S102). Reception jobs and timer jobs are not targets of this determination, and in the case of these jobs (NO in Step S102), it is determined that a virus check is not necessary (Step S103). The job processing section 45 (included in the CPU 21) executes the job (Step S104), and this operation is ended (End).

Jobs other than timer jobs input by user operations are targets, and in this case (YES in Step S102), the behavior monitoring section 46 (included in the CPU 21), based on the job data, checks the items (1) to (4) described above (details to be explained later), and detects the presence or absence of any abnormality (Step S105). When no abnormality is detected (NO in Step S106), it is determined that no virus check is necessary (Step S103). The job processing section 45 executes the job (Step S104), and this operation is ended (End).

When any abnormality is detected (YES in Step S106), the behavior monitoring section 46 determines that a virus check is necessary (Step S107). The virus checking section 47 (included in the CPU 21) carries out a virus check by comparing with the virus definitions file 38 (pattern matching) for the data stored within the multifunction peripheral 10 (Step S108). The targets of the virus check are the job data related to the jobs before execution, programs, files, and various types of stored data that are likely to be infected by a computer virus.

During this virus check, when no computer virus is detected (NO in Step S109), the job processing section 45 executes the job (Step S104), and this operation is ended (End). When any computer virus is detected (YES in Step S109), the CPU 21 carries out virus removal processing (Step S110), and ends this operation (End).

Next, the detailed operations are explained using FIG. 7 to FIG. 15.

Figure 7:
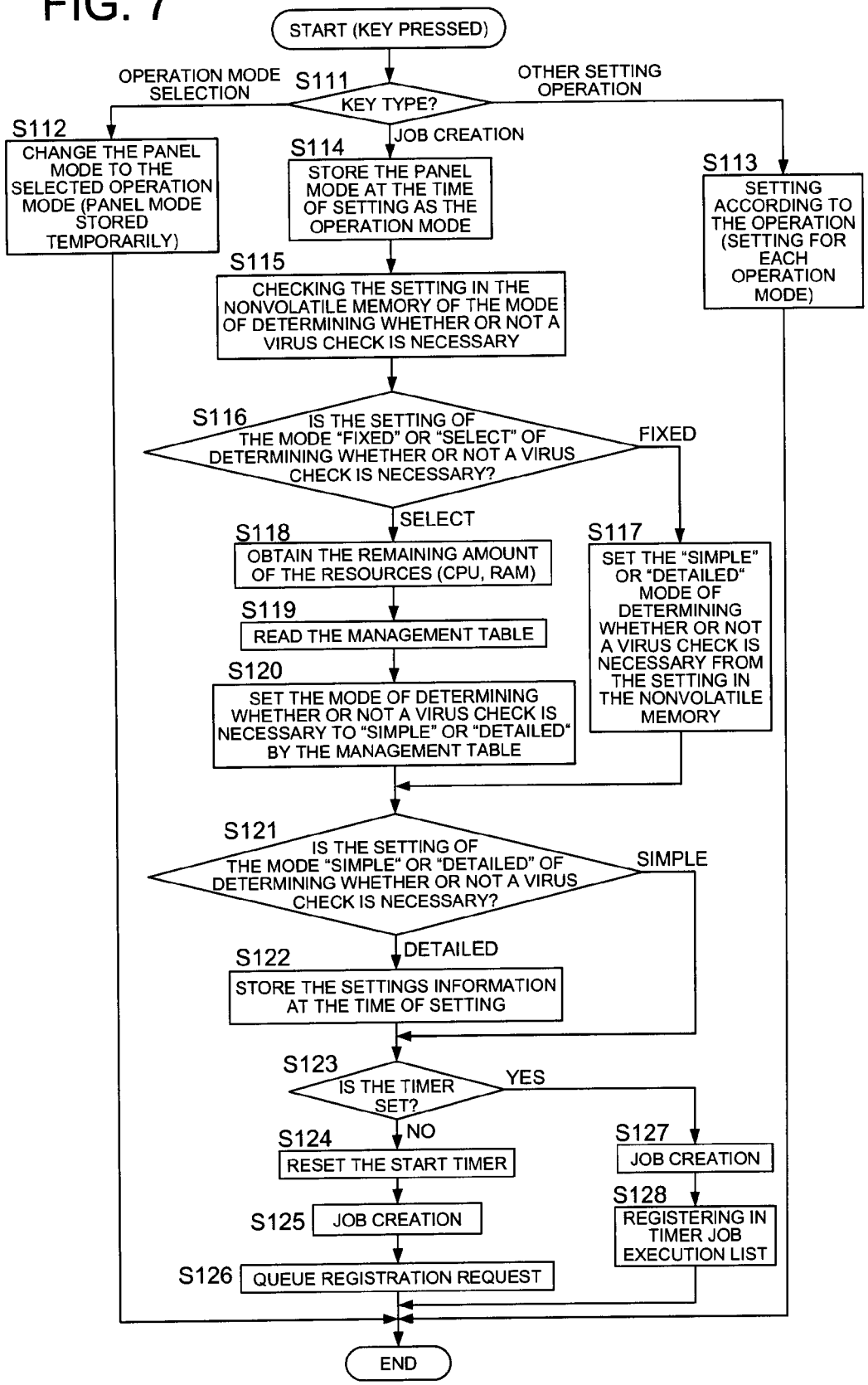
FIG. 7 is a flow chart showing the operations of making the settings, generation, and queue registration request of a job made by a multifunction peripheral.

FIG. 7 is a flow chart showing the operations made by the multifunction peripheral 10 of making the job settings, creating a job, and requesting for registration in the queue. The explanations are given here for the case in which the management table 36*a* is related to the remaining usage amount of the resources shown in FIG. 4.

These operations are carried out every time any key (button) of the operation section 28 provided in the operation panel 35 is pressed.

The CPU 21, upon accepting the operation of pressing any key in the operation section 28, starts this operation (Start). When the pressed key is a mode selection key, (Mode selection in Step S111), the CPU 21 (includes the state management section 43, the operation processing section 41, and the display processing section 42) changes the state of the operation panel 35 to the panel mode corresponding to the selected operation mode (Step S112), and ends this operation (End). Further, the CPU 21, after changing the panel mode, retains (temporarily stores) the information indicating the panel mode in the current state.

When the pressed key is a key related to some other setting operation (Other setting operations in Step S111), the CPU 21, in the panel mode corresponding to the selected operation mode, carries out a setting according to the operation for the job in that operation mode (Step S113), and ends this operation (End).

When the pressed key is the Start key (Job creation in Step S111), the operation moves on to the operation of creating a job. The CPU 21 stores the panel mode at the time of pressing the start key (at the time of settings completion) as the operation mode in the RAM 24 or in the nonvolatile memory 25 (Step S114), and checks the settings information related to the mode of determining whether or not a virus check is necessary that is stored in the nonvolatile memory 25 (Step S115).

When fixing of the mode of determining whether or not a virus check is necessary is confirmed from the settings information (Fixed in Step S116), the CPU 21, from the information indicating simple determination or detailed determination included in that settings information determines the mode of determining whether or not a virus check is necessary as the simple determination mode or the detailed determination mode (Step S117), and moves on to Step S121.

When selecting of the mode of determining whether or not a virus check is necessary is confirmed from the settings information (Select in Step S116), the CPU 21 obtains the remaining usage amount of the resources (CPU 21, RAM 24) at the present time (Step S118), reads the management table (36*a*) from the nonvolatile memory 25 (Step S119), and determines the mode of determining whether or not a virus check is necessary to be the simple determination mode or the detailed determination mode by comparing the remaining usage amount of resources with the management table (Step S120), and moves on to Step S121.

Further, when using the management table 36*b* related to the remaining usage of the resources shown in FIG. 5, the operations can be changed so that the CPU 21 obtains the remaining usage amount of the resources (CPU 21, RAM 24) at the present time and calculates the remaining usage ratio, reads the management table (36*b*) from the nonvolatile memory 25, and determines the mode of determining whether or not a virus check is necessary to be the simple determination mode or the detailed determination mode by comparing the remaining usage ratio of resources with the management table.

When the mode of determining whether or not a virus check is necessary is determined to be the detailed determination mode (Detailed in Step S121), the CPU 21 stores in the RAM 24 or in the nonvolatile memory 25 the settings information (excluding the operation mode) retained at the time the start key is pressed (at the time of settings completion) (Step S122), and moves on to Step S123. When the mode of determining whether or not a virus check is necessary is determined to be the simple determination mode (Simple in Step S121), the operation moves on as it is to Step S123.

When a timer setting has not been made (NO in Step S123 (Non-timer job)), the CPU 21 resets the start timer that measures the time after the start key is pressed (Step S124). The start timer, for example, is configured as a timer (time counter) that continues to count the time at all times, its value is returned to "0" when it is reset (zero reset), after which its count is incremented by "1" at constant intervals of time.

Further, the CPU 21 creates a job (Step S125). In detailed terms, the job data is generated based on the settings information retained at the time the start key was pressed (at the time of settings completion) and is stored in the RAM 24 or in the nonvolatile memory 25. In addition, the history information of the created job is stored in the job history table 37. The history information that is stored is the user ID, job ID, job creation date and time, status, job settings information, etc. Later when the job execution is completed, even the job execution date time will be stored. Further, here, the status of the job in the job history information is stored as "Before queue registration". Further, the CPU 21 executes a queue registration request for the created job (Step S126), and ends this operation (End).

When a timer setting has been made (YES in Step S123 (timer job)), the CPU 21, similar to that in Step S125, creates a job (Step S127), and stores the history information of the created job in the job history table 37. The status of the job in the job history information is stored as "Before queue registration". Next, the CPU 21 registers the created job in the timer job execution list (Step S128), and ends this operation (End). Further, when a job is registered in the timer job execution list, it is also possible to update the status of the job in the job history table 37 as "Timer list registration", etc.

Figure 8:
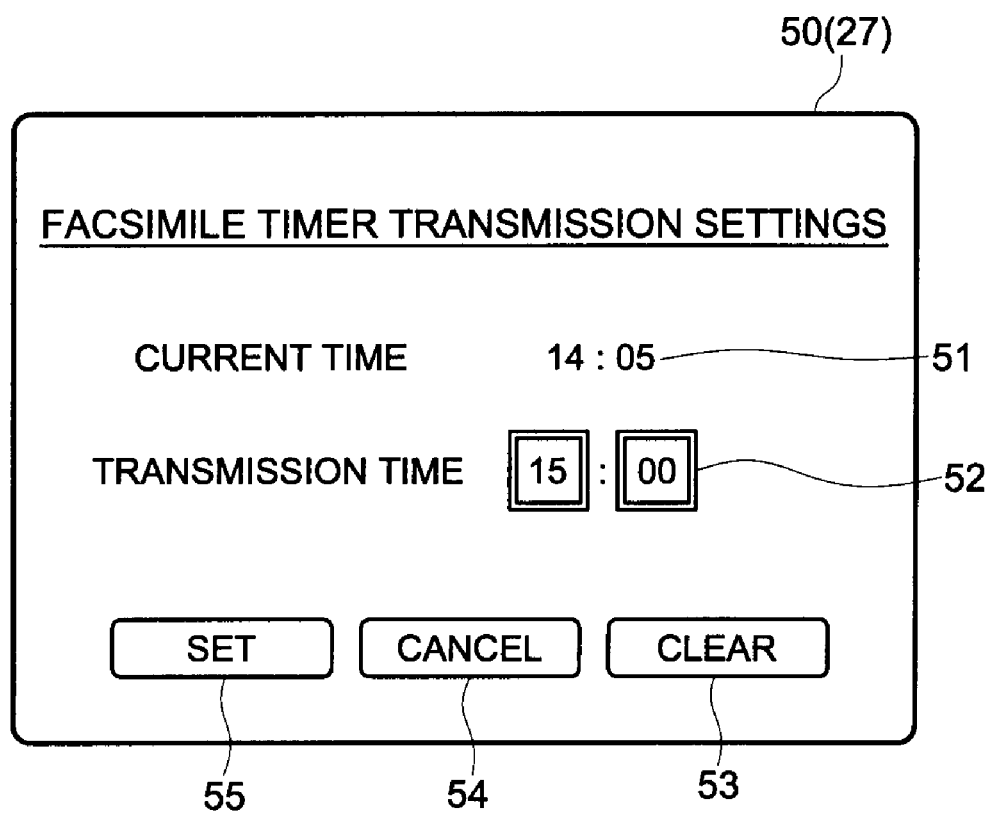
FIG. 8 is a diagram showing the timer transmission setting screen displayed in the display section of the multifunction peripheral.

FIG. 8 is a diagram showing an example of the timer transmission settings screen 50 displayed in the display section 27 of the multifunction peripheral 10. When the display processing section 42 and the operation processing section 41 (included in the CPU 21) accepts an operation in the operation section 28 of starting the settings of a timer transmission, they display the timer transmission settings screen 50 in the display section 27.

The timer transmission settings screen 50 displays the current time 51, the transmission time 52 that is set in units of a minute by operating the ten keys, etc., in the operation panel 35, a Clear button 53 for clearing the information of the transmission time that has been input, a Cancel button 54 for canceling the timer transmission setting and a settings confirmation button 55 for establishing the timer transmission setting. The user, through the operation of the buttons displayed in the timer transmission setting screen 50 and of the ten keys, etc. in the operation panel 35, can input the transmission time of a facsimile transmission job that carries out timer transmission, can clear the information of the transmission time that has been input, can cancel the setting, or can confirm the setting.

Figure 9:
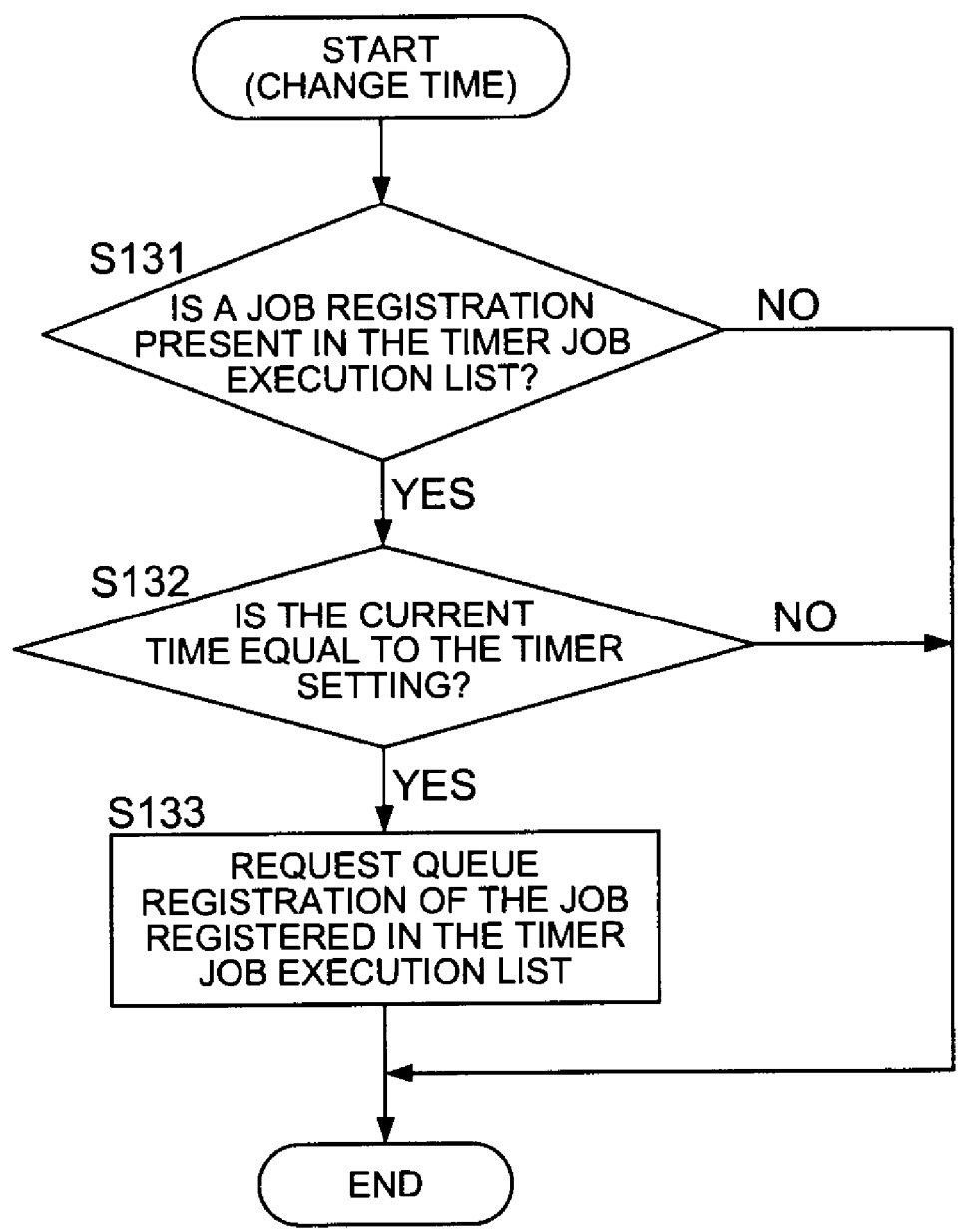
FIG. 9 is a flow chart showing the operations of queue registration request of a timer job by the multifunction peripheral.

FIG. 9 is a flow chart showing the operation of the queue registration request of a timer job executed by the multifunction peripheral 10. These operations are carried out every time the time in units of a minute is updated.

The CPU 21 starts this operation when the time in units of a minute is updated in the clock section not shown in the figure (Start). The job management section 44 (included in the CPU 21) checks whether or not the job has been registered in the timer job execution list (Step S131). If the job has not been registered (NO in Step S131), it ends this operation (End).

If the job has been registered (YES in Step S131), a check is made as to whether or not the updated current time is equal to the transmission time (facsimile timer transmission time) related to the job data of a timer job (Step S132). If it is not the transmission time (NO in Step S132), this operation is ended (End). If the current time is equal to the transmission time (YES in Step S132), then a queue registration request is executed for that job (Step S133), after which this operation is ended (End).

Figure 10:
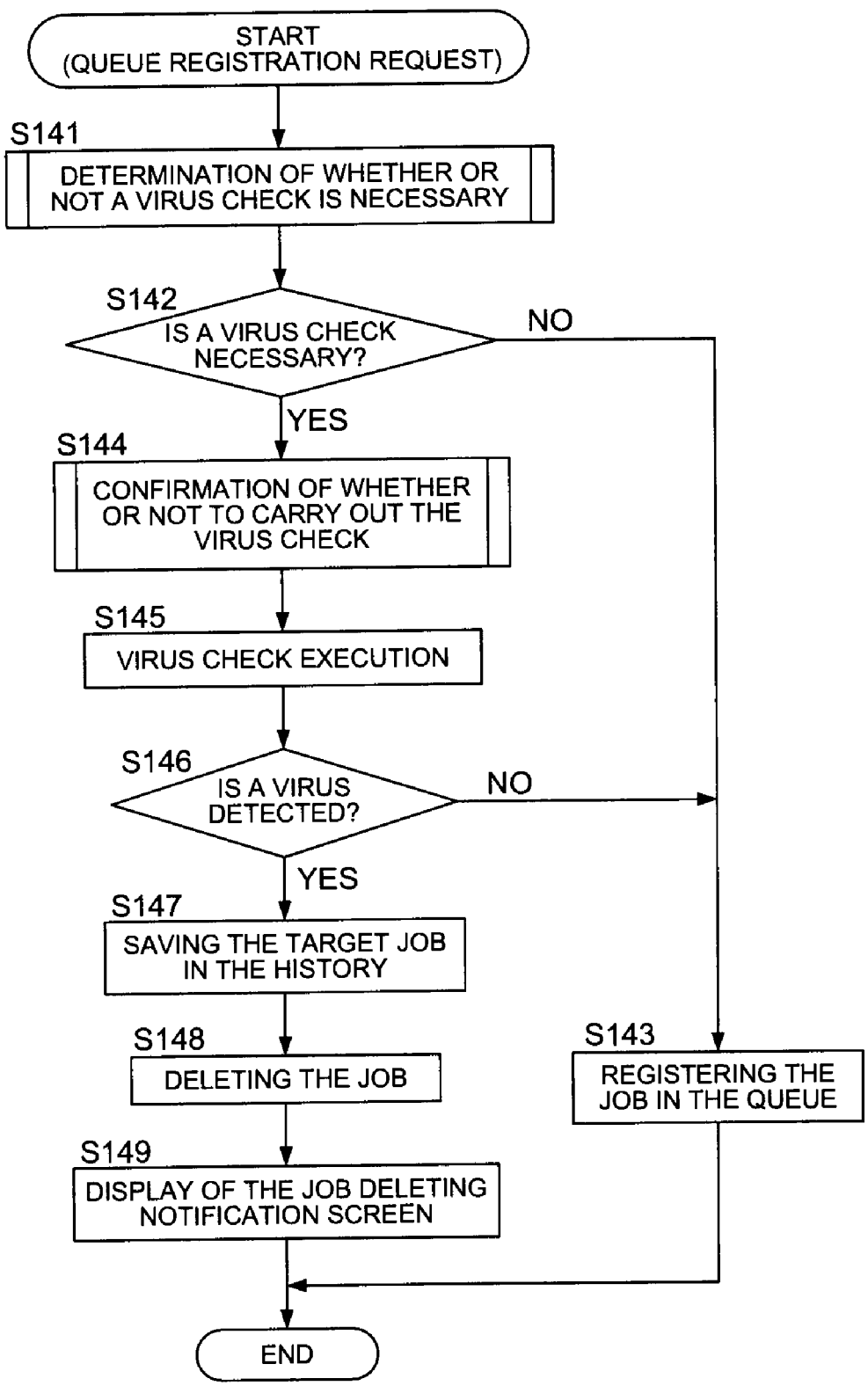
FIG. 10 is a flow chart showing the operations by the multifunction peripheral in response to a queue registration request of a job.
Figure 11:
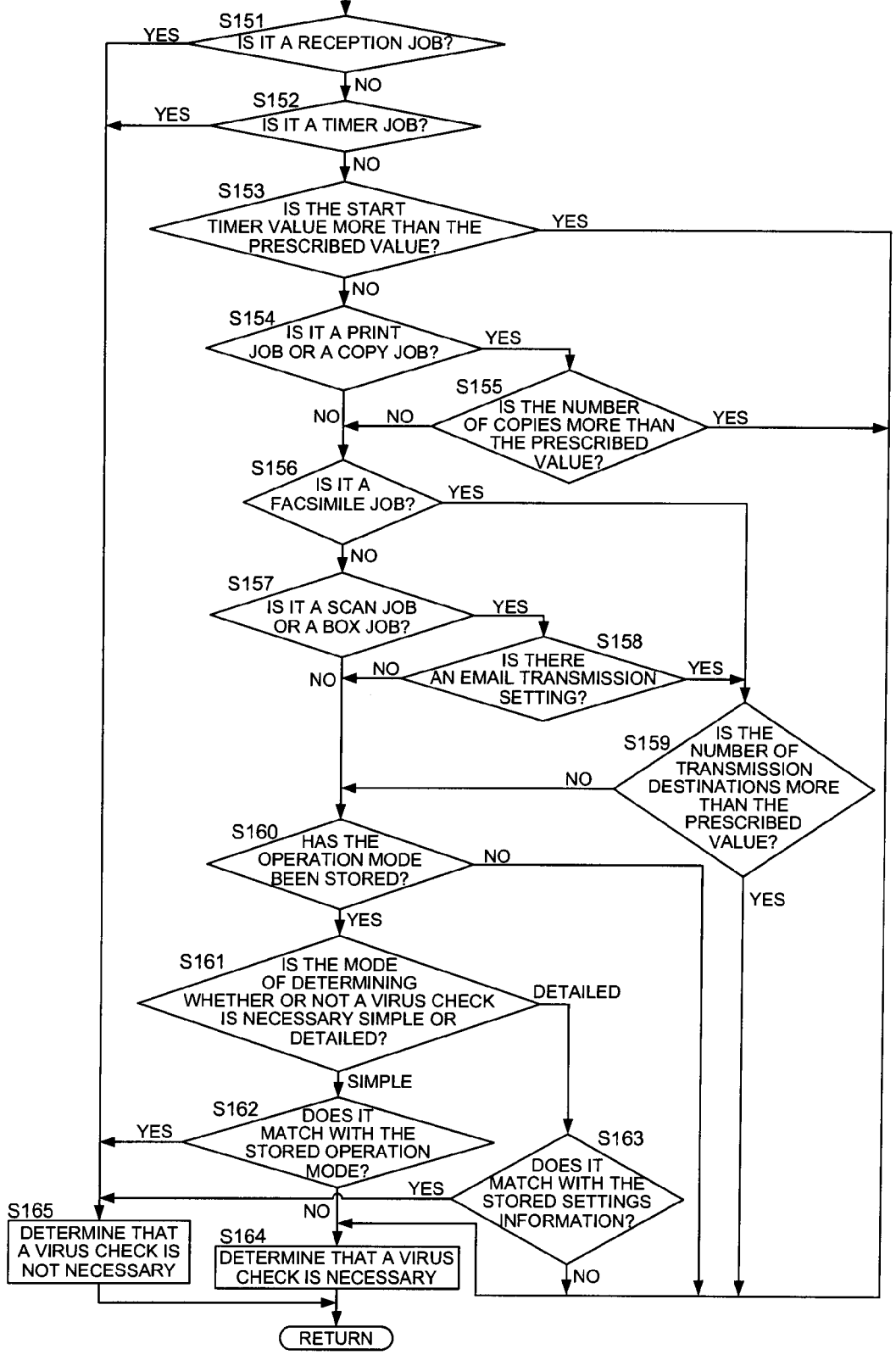
FIG. 11 is a flow chart showing the subroutine of deciding whether or not a virus check is necessary in FIG. 10.
Figure 12:
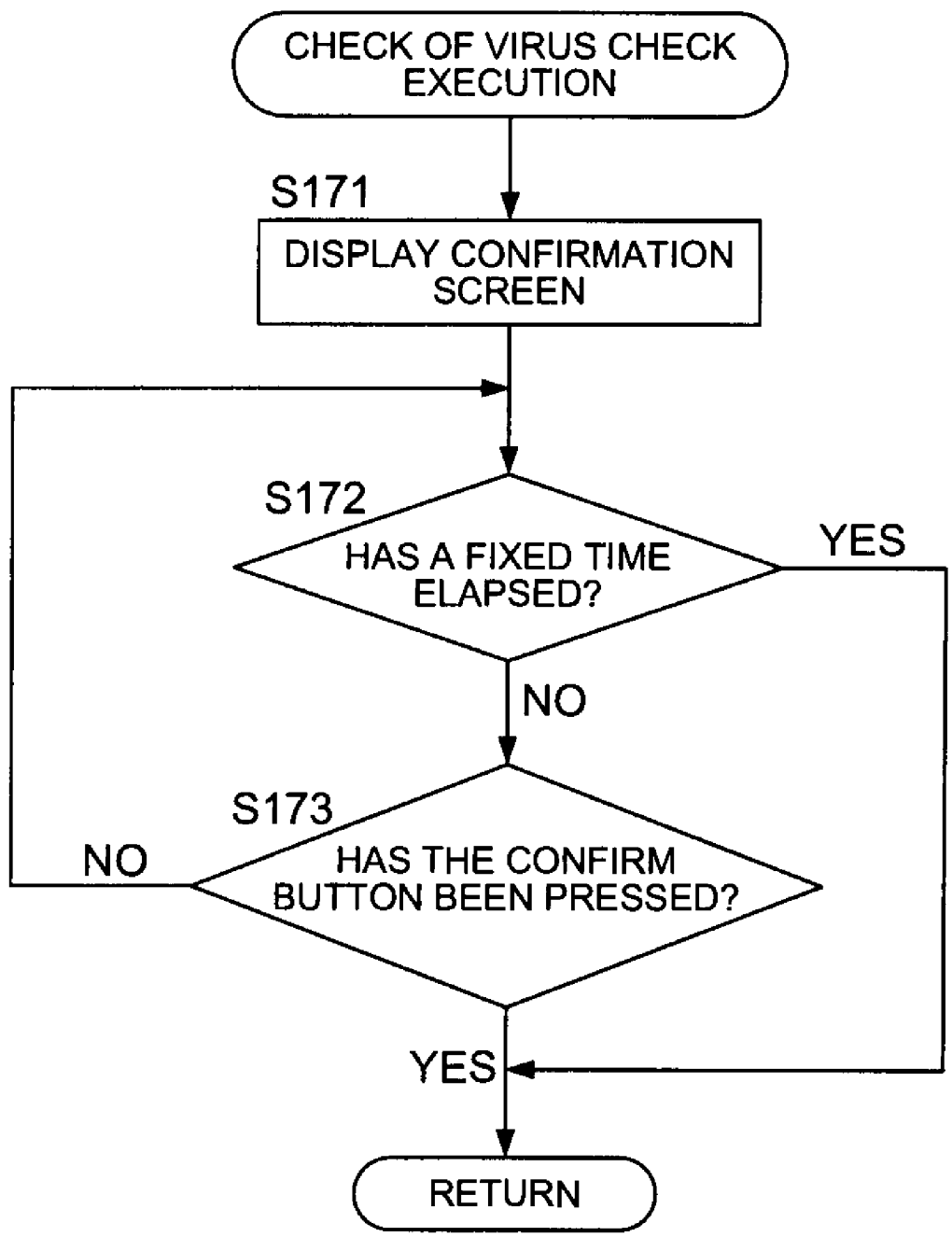
FIG. 12 is a flow chart showing the subroutine of confirming the execution of a virus check in FIG. 10.

FIG. 10 to FIG. 12 are flow charts showing the operations for a queue registration request of a job by the multifunction peripheral 10. In detailed terms, FIG. 10 is a flow chart showing the main routine of this operation, FIG. 11 is a flow chart showing the subroutine of the determination of whether or not a virus check is necessary, and FIG. 12 is a flow chart showing the subroutine of confirming the virus check execution. Here, the explanations are given together for FIG. 10 to FIG. 12. In addition, the operation of the main routine is executed every time a queue registration request of a job is executed.

When a queue registration request of a job is executed, the CPU 21 starts the operation of the main routine shown in FIG. 10 (Start), and carries out the determination of whether or not a virus check is necessary using a subroutine (Step S141).

In the subroutine shown in FIG. 11, the job management section 44 (included in the CPU 21) checks whether or not the target of queue registration request is a reception job (Step S151). If it is a reception job (YES in Step S151), the behavior monitoring section 46 (included in the CPU 21) determines that a virus check is not necessary (Step S165), ends this subroutine, and returns to the main routine (Return).

Next, the job management section 44 checks whether or not the target of queue registration request is a timer job (Step S152). If it is a timer job (YES in Step S152), the behavior monitoring section 46 determines that a virus check is not necessary (Step S165), ends this subroutine, and returns to the main routine (Return).

If it is any other job (a job other than a timer job and is a job created by user operations) (NO in Step S152), the behavior monitoring section 46 checks the count value of the start time (Step S153). When the count value of the start timer is equal to or more than a prescribed value (YES in Step S153), an abnormality is detected and it is determined that a virus check is necessary (Step S164), this subroutine is ended, and the processing is returned to the main routine (Return).

When the count value of the start timer is less than a prescribed value (NO in Step S153), the job management section 44 checks whether or not the target of queue registration request is a copying job or a printing job (Step S154). If it is not such a job (NO in Step S154), the processing proceeds to Step S156. If it is such a job (YES in Step S154, the behavior monitoring section 46 checks the number of copies to be printed in the job data (Step S155). If the number of copies to be printed is equal to or more than a prescribed value (YES in Step S155), an abnormality is detected and it is determined that a virus check is necessary (Step S164), this subroutine is ended, and the processing is returned to the main routine (Return). If the number of copies to be printed out is less than a prescribed value (NO in Step S155) the processing moves on to Step S156.

The prescribed value (a prescribed threshold value) of the above number of copies to be printed out can be, for example, the upper limit setting value of the number of copies to be printed out in the multifunction peripheral 10, or can be an upper limit setting value of the number of copies to be printed out established in the department, etc. Further, this can also be determined based on the maximum number of copies in the past history. This can also be a value that is extremely high compared to the maximum number of copies, for example, a value obtained by multiplying the maximum number of copies to be printed out by a prescribed factor (prescribed multiplication factor), or a prescribed number of copies (prescribed additional number of copies) added to the maximum number of copies, etc. In concrete terms, for example, when the maximum number of copies in the past history is 20, this can be set by multiplying this by a prescribed factor of 5 as 100 copies, or can be set by adding a prescribed number of copies of 100 copies and set as 120 copies.

In Step S156 the job management section 44 checks whether or not the target of queue registration request is a facsimile transmission job (fax job) (Step S156). If it is not such a job (NO in Step S156) the processing proceeds to Step S157. If it is such a job (YES in Step S156) the processing proceeds to Step S159.

In Step S157 the job management section 44 checks whether or not the target of queue registration request is a scan job or a box job (Step S157). If it is not such a job (NO in Step S157) the processing proceeds to Step S160. If it is such a job (YES in Step S157) a check is made as to whether or not an email transmission setting has been made (Step S158). If no email transmission setting has been made (NO in Step S158), the processing proceeds to Step S160. If an email transmission setting has been made (YES in Step S158), the processing proceeds to Step S159.

Further, although email transmission has been given as an example of the target for carrying out confirmation of transmission setting in Step S158, it is also possible to make other types of transmissions the target for such confirmation, such as, for example, file transmission by FTP (File Transfer Protocol), etc.

In Step S159, the behavior monitoring section 46 checks the number of transmission destinations in the job data (Step S159). When the number of transmission destinations is equal to or more than a prescribed value (YES in Step S159), an abnormality is detected and it is determined that a virus check is necessary (Step S164), this subroutine is ended, and the processing is returned to the main routine (Return). When the number of transmission destinations is less than a prescribed value (NO in Step S159), the processing proceeds to Step S160.

The prescribed value (a prescribed threshold value) of the above number of transmission destinations can be, for example, the upper limit value of the number of transmission destination registrations in the multifunction peripheral 10, or can be the total number of transmission destinations registered beforehand, etc.

In Step S160, the behavior monitoring section 46 checks whether or not the operation mode has been stored (Step S160). If the settings of the job have been accepted via the operation section 28 and the job has been created normally upon accepting the pressing of the start key, since the panel mode at the time of settings completion in Step S114 of FIG. 7 would have been stored as the operation mode, here a check is made of the presence or absence of that storing of the operation mode of the job (=panel mode) that ought to have been made at the time of settings completion.

If the operation mode has not been stored (NO in Step S160), an abnormality is detected and it is determined that a virus check is necessary (Step S164), this subroutine is ended, and the processing is returned to the main routine (Return). When the operation mode has been stored (YES in Step S160), the CPU 21 checks whether the mode of determining whether or not a virus check is necessary is the simple determination mode or the detailed determination mode (Step S161).

When the mode of determining whether or not a virus check is necessary is the simple determination mode (Simple in Step S161), the behavior monitoring section 46 compares the operation mode in the generated job data with the stored operation mode, that is, with the operation mode (=panel mode) of the job at the time of settings completion, and checks whether or not they are the same (Step S162).

When they are the same (YES in Step S162), it is determined that a virus check is not necessary (Step S165), this subroutine is ended, and the processing is returned to the main routine (Return). When they are not the same (NO in Step S162), an abnormality is detected and it is determined that a virus check is necessary (Step S164), this subroutine is ended, and the processing is returned to the main routine (Return).

When the mode of determining whether or not a virus check is necessary is the detailed determination mode (Detailed in Step S161), the behavior monitoring section 46 compares the generated job data with the stored settings information (includes the operation mode), that is, the settings information (includes the operation mode=the panel mode) indicating the contents of settings of the job at the time of settings completion, and checks whether or not they are the same (Step S163).

When they are the same (YES in Step S163), it is determined that a virus check is not necessary (Step S165), this subroutine is ended, and the processing is returned to the main routine (Return). When they are not the same (NO in Step S163), an abnormality is detected and it is determined that a virus check is necessary (Step S164), this subroutine is ended, and the processing is returned to the main routine (Return).

In the main routine shown in FIG. 10, when the determination of whether or not a virus check is necessary is completed, the behavior monitoring section 46 checks the result of determination (Step S142). When it has been determined that a virus check is not necessary (NO in Step S142), the job management section 44 registers the job in the job queue (Step S143), updates the status of the job in the job history table 37 to "Waiting for execution", and ends this operation (End). After that, when the job execution is started, it updates that status to "Under execution", and when the job execution is completed, updates the status to "Execution completed". In addition, the "date and time executed" is stored in the history information of the job in the job history table 37.

When it has been determined that a virus check is necessary (YES in Step S142), the CPU 21 carries out the confirmation of the execution of a virus check using a subroutine (Step S144).

In the subroutine shown in FIG. 12, before executing a virus check, the user is informed by displaying a confirmation screen that the job is to be deleted and a virus check is to be executed. A virus check is executed when the user presses the confirm button in this screen. Further, here, the virus check is executed even if the user does not press the confirm button but a fixed interval of time has elapsed.

Figure 13:
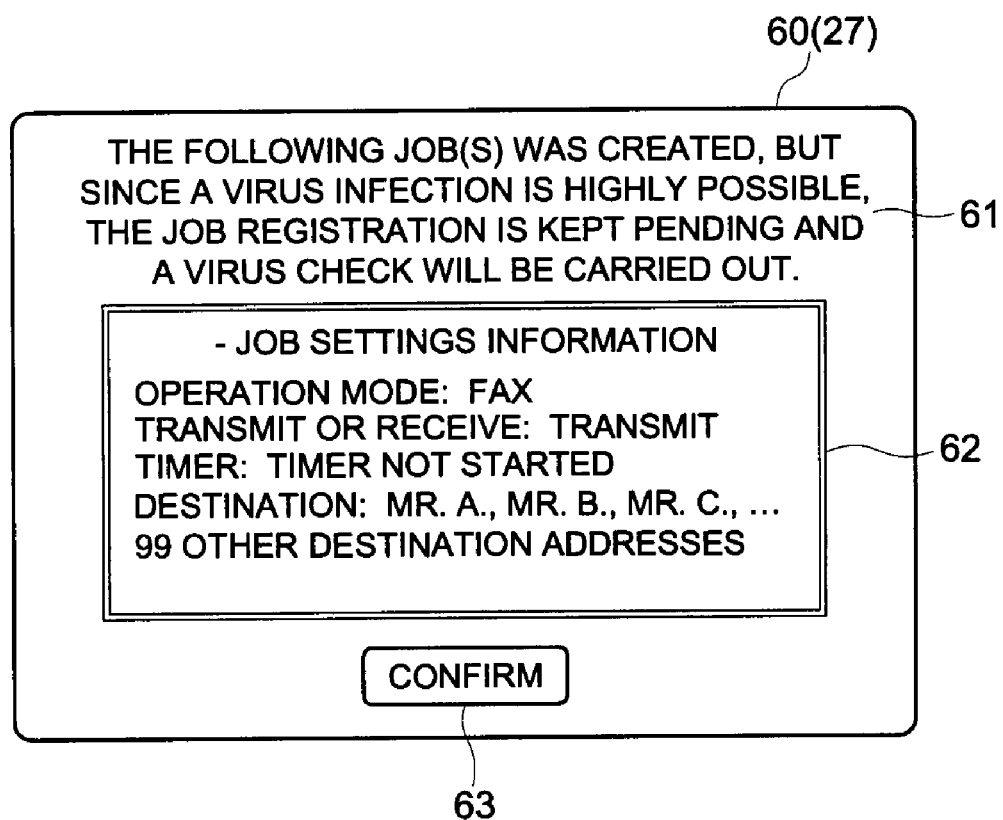
FIG. 13 is a diagram showing a confirmation screen displayed in the display section of a multifunction peripheral.

In detailed terms, the display processing section 42 (included in the CPU 21) displays the confirmation message in the display section 27 (Step S171). FIG. 13 is a diagram showing an example of the confirmation screen 60 that is displayed in the display section 27 of the multifunction peripheral 10.

In the confirmation screen 60 are displayed a message 61 informing the user that the job is to be deleted and a virus check is to be executed, the settings information 62 of the job that is to be the target of the virus check, and a Confirm button 63 for accepting the expression of intention by the user confirming the action to be taken. The user can view this message 61 and the job settings information 62 displayed in the confirmation screen 60 and can know the information of the job that the user intends to execute and can grasp any abnormality (high possibility of virus infection). In addition, by pressing the Confirm button 63, the user can express the intention of confirming the job deleting and executing the virus check.

In the subroutine shown in FIG. 12, the operation processing section 41 and the display processing section 42 (included in the CPU 21) monitor the pressing of the Confirm button 63 in the confirmation screen 60. When the pressing of the Confirm button 63 is accepted (YES in Step S173), the display of the confirmation screen 60 is terminated, this subroutine is ended, and the processing is returned to the main routine (Return). When the pressing of the Confirm button 63 has not been accepted but a fixed time interval has passed (YES in Step 172), the display of the confirmation screen 60 is terminated, this subroutine is ended, and the processing is returned to the main routine (Return).

In the main routine shown in FIG. 10, when the confirmation of the execution of a virus check has been confirmed, the virus checking section 47 (included in the CPU 21) executes a virus check (Step S145). When no computer virus was detected during the virus check (NO in Step S146), the job management section 44 (included in the CPU 21) registers the job in the job queue (Step S143), and ends this operation (End). After that, when the execution of this job is started, it updates that status to "Under execution", and when the job execution is completed, updates the status to "Execution completed". In addition, the "date and time executed" is stored in the history information of the job in the job history table 37.

When a computer virus was detected during the virus check and the job before execution (a job registered in the job queue and waiting for execution or a created job for which a queue registration request has been issued) is infected by a computer virus (YES in Step S146), that job will be deleted. The job management section 44 stores the job that is the target of deleting in the history (Step S147), and deletes the target job (Step S148). During the storing of the history, not only the status (before queue registration, or waiting for execution) stored in the job history table 37 at the time of deleting the target job is stored, but also "Deleted" is stored additionally thereby establishing correspondence. Next, the display processing section 42, using the history information of the job stored in the job history table 37, displays a job deleted notification screen in the display section 27 (Step S149), and ends this operation (End).

Figure 14:
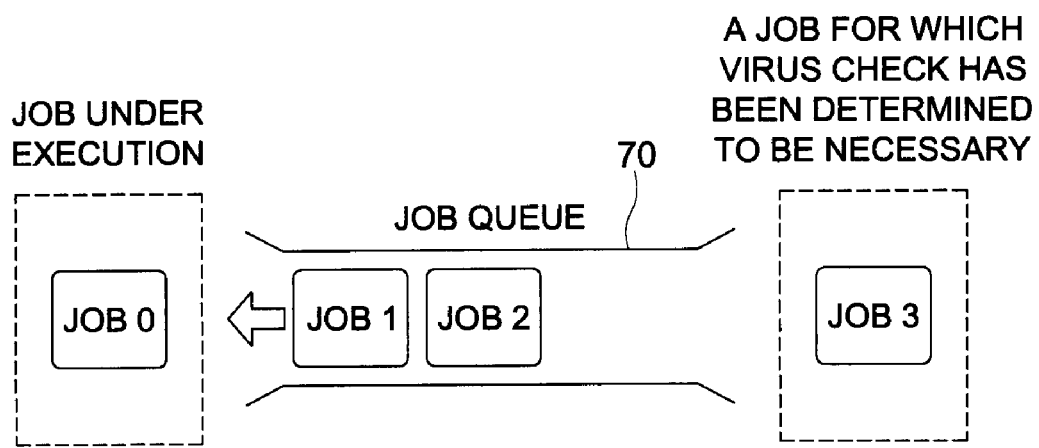
FIG. 14 is a diagram showing schematically the control and processing states of a job in a multifunction peripheral.

FIG. 14 is a diagram showing schematically the management of jobs and the processing statuses. Regarding the execution of a virus check, the cases are considered in which the job is already being executed, or there is more than one job in the job queue. For example, as is shown in FIG. 14, there is the case in which a Job 0 is being executed, the two jobs Job 1 and Job 2 are registered in the job queue 70 and are waiting to be executed, and a Job 3 has been created, a queue registration request has been issued for it, and it has been determined that a virus check is necessary for that Job 3.

In such a case, if the virus check is carried out immediately, since the processing of the job under execution becomes slow, for example, after the processing is completed of the job under execution, the execution of the next job is kept pending, and then the virus check is started. Next, when a computer virus is detected it is removed. Further, when the jobs for which queue registration requests have been issued and the jobs that have been registered in the job queue 70 are infected by a computer virus, those jobs are deleted. For example, in addition to the created Job 3 shown in FIG. 14, if even the execution awaiting Job 1 and Job 2 are infected by a computer virus, then all these jobs will be deleted.

FIG. 15 is a diagram showing an example of the job deleted notification screen 80 displayed in the display section 27 of the multifunction peripheral 10.

In the job deleted notification screen 80, a message 81 informing the user that jobs infected by a computer virus have been deleted and a deleted job list 82 which is the information (history information) are displayed relating to the deleted jobs. The timing of displaying this job deleted notification screen 80 can also be after a virus check is completed, or can also be during or after a virus removal processing. Further, it is also possible to let the user select in a menu selection whether or not to make this display. Viewing the displayed message 81 and the deleted job list 82 of the deleted notification screen 80, it is possible for the user to grasp the information of the job that was infected by a virus and deleted.

In this manner, in a multifunction peripheral 10 according to the present preferred embodiment, by determining before executing a job whether or not a virus check is necessary, in other words, even when the multifunction peripheral is infected by a computer virus or a computer virus is related to a job, by determining whether or not a virus check is necessary based on the job data but without executing that job, it is possible to determine whether or not a virus check is necessary before any damage is done by the computer virus. In addition, if it is a determination based on the job data, it is possible to make the determination immediately but also the determination processing itself becomes simple and the processing load can be suppressed. For example, even if a determination of whether or not a virus check is necessary is made based on the job data related to a job immediately after it has been created while a previous job is still being executed, etc., the load on the current processing will be small. Because of this, it is possible to carry out determination of whether or not a virus check is necessary without obstructing the processing.

Further, when it is determined that a virus check is necessary because an abnormality was detected based on the job data, it becomes possible to take measures before executing the job, such as carrying out a virus check at an appropriate timing, removing a computer virus when a computer virus is detected, and also deleting a job related to a computer virus (illegal job creation, data tampering, infection). Because of this, even in a case in which it is difficult to execute a virus check (program) periodically and frequently in other to avoid reduction in the processing performance it becomes possible to execute a virus check efficiently, and to prevent in advance any damage by a computer virus.

Further, in the setting of automatically selecting the mode of determining whether or not a virus check is necessary, when the degree of margin (remaining usage amount, remaining usage ratio) of the resources (CPU, RAM) is small (less than or equal to a prescribed value), the simple determination mode is selected in which only the operating mode is compared between the job data and the settings information, and the degree of margin of the resources is large (more than a prescribed value), the detailed determination mode is selected in which all the items are compared between the job data and the settings information. Because of this, no bad effects such as delay, stagnation, or interruption are caused on the current processing, and it becomes possible to carry out an appropriate simple or detailed comparison considering the degree of margin of the resources (considering the current processing).

When the simple determination mode is selected for the determination of whether or not a virus check is necessary, since only the operation mode is stored and compared, compared to the detailed determination mode of storing all the settings information (individual information of each of the setting items) and comparing with all the data values in the job data, not only is it possible to reduce the necessary amount of storage, but also it is possible to make the comparison processing itself and to reduce the processing load. When the detailed determination mode is selected for the determination of whether or not a virus check is necessary, since the entire contents of the job data and the settings information are compared in detail, it is possible to detect more accurately the occurrence of any abnormality.

Further, in the case of both simple and detailed determination modes, using the panel mode at the instant of time when the job settings are completed by a user operation, the operation mode (=the panel mode) in the settings information is stored, and an abnormality is detected by comparing it with the operation mode in the job data. For example, in case the operation mode in the job data is modified from copying to facsimile (transmission), etc., due to a computer virus, although there is the possibility of a high damage being caused by extending the infection to the external apparatus in the destination of transmission or of information leakage, it is possible to detect such malicious modifications and to prevent any damage.

Particularly in the present preferred embodiment, even when the operation mode itself in the settings information has been modified by a computer virus, by storing the panel mode at the instant of time of settings completion as the operation mode, it is possible to store accurately and safely the operation mode specified by the user using the panel mode, and it is also possible to detect abnormalities due to such modifications of the settings information (operation mode).

Further, at the instant of time of settings completion by a user operation, the operation mode (=the panel mode) in the settings information is being stored or retained. The job data is generated based on the settings information at this instant of time of settings completion, and indirectly corresponds with the stored operation mode (=the panel mode).

In the configuration of the present preferred embodiment in which the settings information is stored when the settings completion of the job is accepted from the user, it can be judged that a job data generated in the condition in which the operation mode in this settings information has not been stored is not a legal job data generated based on the settings information, but is an illegal job data that is highly likely to have been generated by a computer virus. By basing on the presence or absence of storing the operation mode (settings information) in this manner, it is possible to distinguish illegal jobs that are not based on user operations, and to detect abnormalities.

Further, although when the settings completion operation is accepted from the user for a job (pressing of the Start key) that job data is generated immediately thereafter, a job data generated after a long time (prescribed time) has elapsed after the settings completion can be judged to be illegal job data that is highly likely to have been generated by a computer virus. In this manner, by basing on the time elapsed from the instant of time of settings completion (count value of the start timer) and the timing of creation of the job (generation of the job data), it is possible to distinguish illegal jobs that are not based on user operations, and to detect abnormalities.

Further, when the data values (number of copies to be printed or number of transmission destinations) included in the job data is equal to or more than the prescribed value, it can be judged that it is highly possible that the data values have been tampered with by a computer virus. In this manner, basing only on the job data, it is possible to distinguish tampering of the job data and to detect an abnormality.

Further, if there is a job under execution when it is determined that a virus check is necessary, since the processing of that job is given priority and the virus check is not executed until the processing is completed, the processing of a job under execution is not obstructed by the execution of a virus check. In addition, if there are jobs waiting to be executed, since, after the completion of the processing of a job under execution the jobs waiting to be executed are kept pending and the virus check is executed, it is possible to carry out a virus check without obstructing the processing of the job under execution and at as early a timing as possible but before executing the jobs waiting to be executed (before any damage is done in case there is an infection by a computer virus).

Second Preferred Embodiment

The second preferred embodiment is a modified example of the first preferred embodiment wherein some parts are changed in the job settings operation, the operations of job creation and queue registration request explained in FIG. 7, and in the processing steps in the operation of the subroutine of determining whether or not a virus check is necessary explained in FIG. 11. In detailed terms, this is a modified example in which the timing of storing the operation mode (panel mode) used for the confirmation of abnormality based on the job data, and the timing of checking and determining the setting of the mode of determining whether or not a virus check is necessary (simple determination mode or detailed determination mode), etc., have been changed and the processing has been simplified. Other operations, display screens, and the configuration of the multifunction peripheral 10 (except for the operating programs), etc., are similar to those in the first preferred embodiment.

Figure 16:
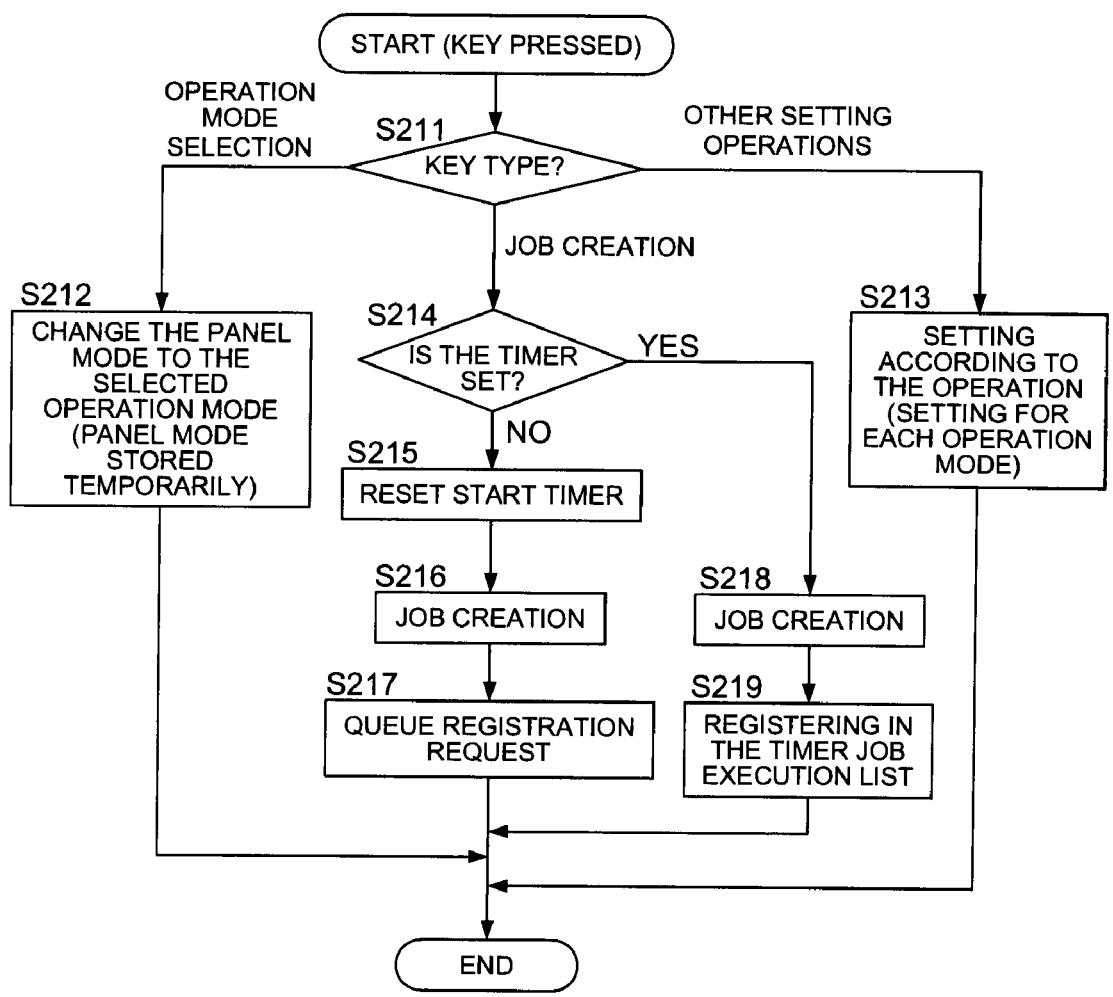
FIG. 16 is a flow chart showing the operations of making the settings, generation, and queue registration request of a job made by a multifunction peripheral according to a second preferred embodiment of the present invention.
Figure 17:
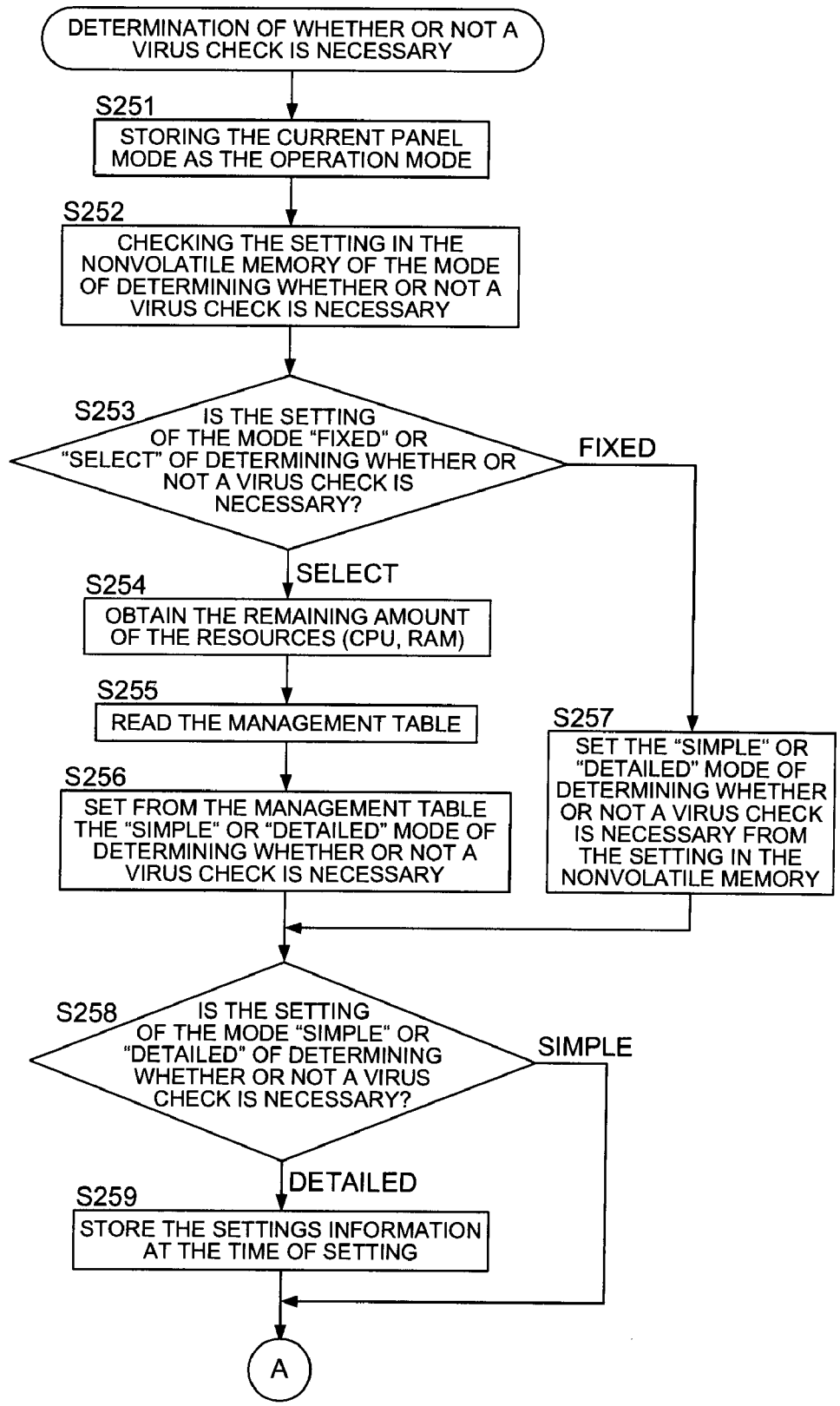
FIG. 17 is a flow chart showing the sub-routine (1/2) of deciding whether or not a virus check is necessary according to a second preferred embodiment of the present invention.
Figure 18:
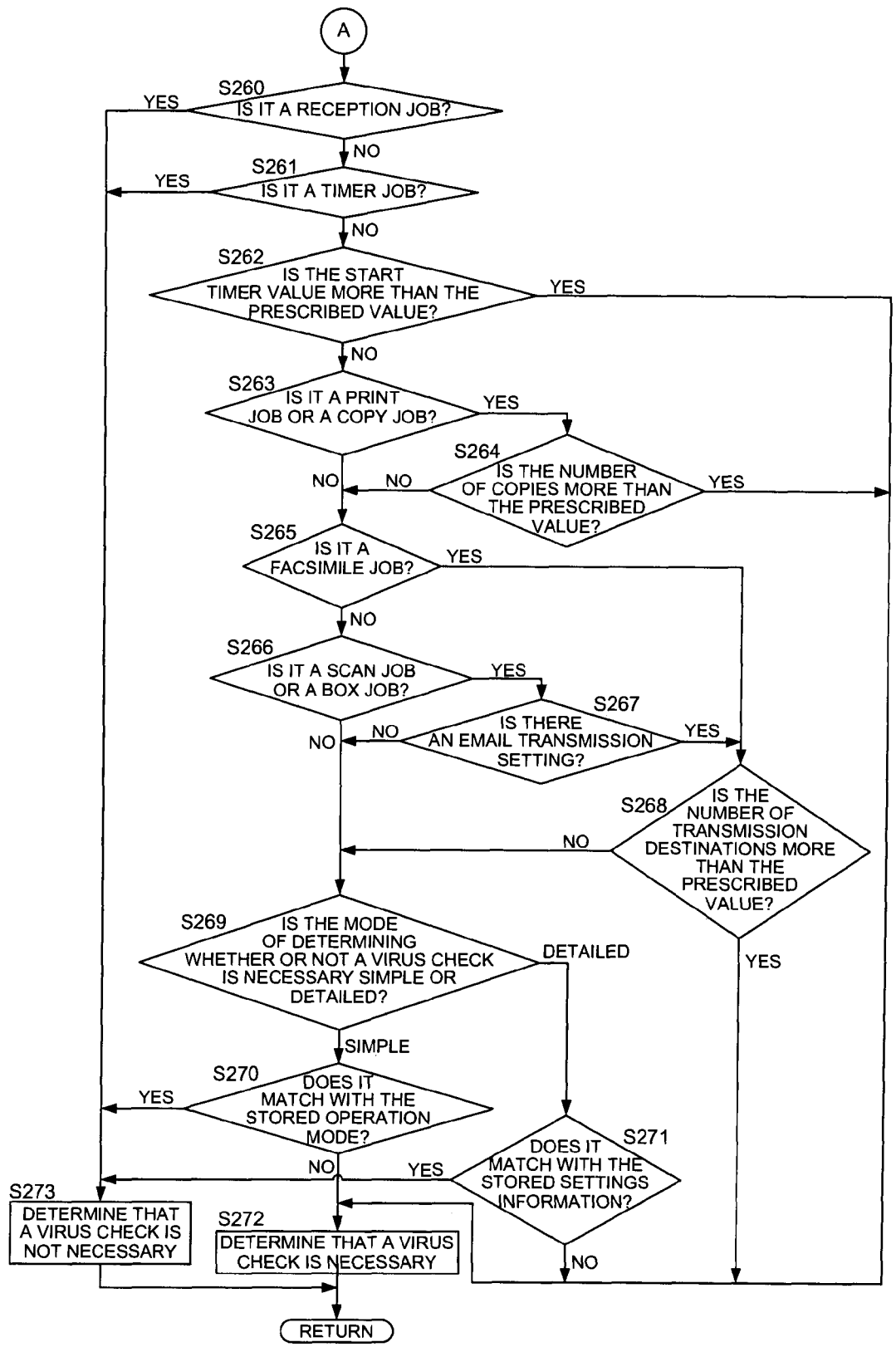
FIG. 18 is a flow chart showing the subroutine (2/2) of deciding whether or not a virus check is necessary according to a second preferred embodiment of the present invention.

FIG. 16 is a flow chart showing the job settings operation and the operations of job creation and queue registration requests according to the present preferred embodiment. FIG. 17 and FIG. 18 are flow charts showing the operation of the subroutine of determining whether or not a virus check is necessary according to the present preferred embodiment. Here, only the points of difference with the first preferred embodiment have been explained below.

In the operation shown in FIG. 16, compared to the first preferred embodiment (FIG. 7), the flow is one in which the Steps S114 to Step S122 have been deleted. Although in the first preferred embodiment, when the pressing operation of the Start key is accepted during the setting of the job by user operations, the panel mode at the instant of time of pressing the Start key (the instant of time of settings completion) was stored as the operation mode in the RAM 24 (Step S114), and the check and determination of the setting of the mode of determining whether or not a virus check is necessary (simple determination mode or detailed determination mode) were being made (Step S115 to Step S122), these processing steps are not carried out in the second preferred embodiment but these operations are carried out.

In the operations shown in FIG. 17 and FIG. 18, compared to the first preferred embodiment (FIG. 11), immediately after starting the main operations, not only the Step S251 corresponding to the Step S114 of FIG. 7, and the Steps 252 to Step S259 with the same contents as the Steps S115 to Step S122 of FIG. 7 have been added (see FIG. 17), but also the Step S160 of the first preferred embodiment has been deleted in this flow (see FIG. 18).

In detailed terms, the operations of FIG. 16 have not been carried out, and the processing step of storing the current panel mode as the operation mode in the RAM 24 or in the nonvolatile memory 25 (Step S251), and the processing steps (Steps S252 to Step S259) of checking and determining the setting of the mode of determining whether or not a virus check is necessary (simple determination mode or detailed determination mode) are being carried out immediately after starting these operations.

Because of this, in Step S251, when a queue registration request is executed for a job created upon receiving the job settings completion due to user operations (Step S211 in FIG. 16; job creation→Step S216→Step S217→step S141 of FIG. 10→Step S251 of FIG. 17), the panel mode at the instant of time of completion of that setting (at the instant of time of pressing the Start key) is stored and retained as the operation mode. In addition, in the case in which the user has not carried out the settings of a job but an illegal job has been created by a computer virus and a queue registration request of FIG. 10 is executed (Start), in Step S141 the subroutines of FIG. 17 and FIG. 18 are started, and in Step S251 the panel mode at the instant of time when this illegal job is created (the current time) is stored and retained as the operation mode. For example, in the case in which an illegal job is created whereby the multifunction peripheral 10 is in the state in which the setting of a job by the user has not been received (in the standby state or in the state in which a job is being executed), and the panel mode is one in which the initial screen is displayed in the display section 27 of the operation panel 35 (the default panel mode), that panel mode is stored and retained as the operation mode.

In such a case, in the check by comparing the operation mode of the job data and the stored operation mode (=panel mode) in Step S270, there will be a mismatch (NO in Step S270), an abnormality is detected and it is determined that a virus check is necessary (Step S272).

In this manner, even in the present preferred embodiment in which the timing of executing the processing step (Step S251) of storing the panel mode as the operation mode, etc., is changed, similar to the first preferred embodiment, the determination of whether or not a virus check is necessary is made based on whether or not the job data is one generated upon accepting settings completion by a user operation, and an abnormality is detected when it is determined that the job is not a job created upon accepting settings completion.

Further, by storing the operation mode (=the panel mode) after a queue registration request is executed (after a job is created), the confirmation that was being done in the first preferred embodiment of whether or not the operation mode (=the panel mode) has been stored becomes unnecessary (Step S160 in FIG. 11). Because of this, in the present preferred embodiment, the processing becomes simpler compared to that in the first preferred embodiment. Further, even in the processing (flow of operations) according to the present preferred embodiment, an effect similar to that of the first preferred embodiment is obtained.

In the above, although explanations were given of some preferred embodiments of the present invention using drawings, the concrete configuration is not restricted to those shown in the preferred embodiments, and all modifications or additions without departing from the scope and intent of the present invention shall be included in the present invention.

For example, in the determination of whether or not a virus check is necessary based on the job data related to a job before its execution (abnormality detection), in the comparison of the job data and the settings information in the simple determination mode, although the explanation given was of an example in which only the operation mode in the settings information was stored and compared, it is also possible to store and compare a plurality of information items including the operation mode (but not all the information items). Further, in the checking of the presence or absence of storing of the settings information, although an example was explained in which only the operation mode was the target, it is also possible to take a plurality of information items including the operation mode or all the information items as the targets.

Regarding the attribute (mode) of the job that becomes the target of checking the presence or absence of the above comparison or storing, apart from the operation mode which is a broad category (the highest category) indicating the job type, it is also possible to use modes of medium categories (prescribed classification modes) such as the basic mode or applied mode that classify a plurality of types of setting items. Further, if it is a configuration in which a plurality of types of panel modes (setting modes) are provided for each of the modes of medium category, the modes of medium categories stored as the setting information can also be used instead of the panel mode explained in the preferred embodiments. In this case, it is also possible to configure as follows.

During the setting of a job, not only is it possible to change among a plurality of setting modes (panel modes) provided for each of the prescribed classification modes (modes of medium category) upon accepting the classification mode selection operation from the operation section, but also there is the feature that, the settings are accepted in the settings mode corresponding to the selected classification mode, and the setting mode at the time of generating the job data is stored in the storage section (the second storage section) as the classification mode in the settings information.

In the first preferred embodiment, although the panel mode at the time of settings completion of a job by a user operation is stored as the operation mode, without using this type of panel mode, it is also possible to store the panel mode itself that was selected by a user operation (the operation mode in the settings information), or to store the above classification mode itself that was selected by a user operation.

In the checking of the data values included in the job data (the determination of whether or not a virus check is necessary based on the job data itself (detection of abnormality)), although the explanations were given taking the number of copies to be printed or the number of transmission destinations as the target data values, the target of data values checked need not be restricted to these. If a limit value for the number of sheets to be printed (upper limit value), etc., has been set in advance, it is also possible to use the number of sheets printed as the target value.

Further, although in the preferred embodiments a check was made of whether or not the target data value is above a threshold value, the details of checking the data values need not be restricted to this. For example, it is also possible to check the presence or absence of the target data value (presence or absence of the data value that ought to be present) or of its accuracy, or to check the consistency between parameters.

In concrete terms, if the configuration is made so that in the job data is included identification information of the user creating that job (user ID) (the user who carried out the job settings and gave the execution instruction), since it is possible to conceive that it is highly probable that such a user identification information is not included in an illegal job data created without user operations, it is also possible to check for the presence or absence of such data values that ought to be present. Further, since it is also possible to conceive that counterfeit user identification information falsely prepared by a computer virus is included, it is also possible to check the accuracy of the target data value. In addition, for example, it is an abnormality if a parameter related to a setting item of a facsimile job (for example, a transmission destination, etc.) is included in the job data of a copying job, it is also possible to check the consistency between parameters such as whether or not a parameter is present that should not be present together with the others in a single job data (the parameters of different types of jobs that should not be present together).

In addition, it is also possible to take several data values as the targets, or to make details of the check to have combinations of a plurality of types.

Apart from basing the automatic selection of the mode of determination of whether or not a virus check is necessary (simple determination or detailed determination) on the degree of margin of the resources, it is also possible to have a configuration in which it is based on the settings information at the time that the job settings completion is accepted.

Further, although in the preferred embodiments only the virus check related to the determination of whether or not it is necessary before job execution was explained, it is also possible to combine this with a virus check that is carried out periodically.

In addition, although in the preferred embodiments the case was explained in which the determination of whether or not a virus check is necessary was made before executing a job, it is also possible to make this determination even after starting the execution of a job or during the execution of a job. For example, even a determination was made after starting the execution of a job that is related to a computer virus, if it is either immediately thereafter or within a relatively short time after starting the determination result is obtained immediately at the instant of time of that determination, and it is possible to interrupt the job and execute a virus check. In this manner, even if it is a determination of whether or not a virus check is necessary which is made after starting the execution of a job, it is possible to sufficiently suppress the damage caused by a computer virus.

Further, although in the preferred embodiments the configuration is one in which the detection section (the virus checking section 47) that detects computer viruses is provided in the multifunction peripheral (image processing apparatus), it is also possible to have a configuration in which this detection section is provided in an external apparatus (server, etc.) included in the job processing system. For example, when the control section (CPU 21) inside the multifunction peripheral determines that a virus check is necessary inside itself, it requests a server provided with the detection section to carry out the virus check inside itself. It is possible to have a configuration in which the server (detection section) accepting the request carries out the virus check inside that multifunction peripheral.

Further, the job processing system and the image processing apparatus according to the present invention need not be restricted to a multifunction peripheral explained in the preferred embodiments, but the present invention can also be targeted to copying machines, scanners, facsimile machines, and other systems and apparatuses.

(1) To achieve at least one of the abovementioned objects, a job processing system reflecting one aspect of the present invention comprising, an operation section accepting an operation of setting of job;

a generate section generating a job data based on a setting information related to the setting of the job which accepted a setting completion in the operation section;

a first storage section storing the generated job data;

an execution section executing the job based on the job data;

a detection section detecting computer viruses within the job processing system; and, a control section deciding necessity of the detection based on the job data related to the job.

In the above item, when operations accepted from the user of the setting and setting completion of a job, job data is generated based on the setting information related to the setting. The setting information is the information specifying the processing conditions of the job according to the contents of the setting made by user operations. The job data is prepared, based on the setting information, as control data that has the processing conditions of the job according to the contents of the setting. The generated job data is stored in the first storage section. The execution section, for the job data generated by such user operations or for a job input from an external apparatus, carries out job execution based on the job data When a computer virus is present within the job processing system, it is possible that an illegal job (job data) is generated, or the job data related to a legal job is tampered with. Further, even a job data that is either generated illegally or is tampered with is likely to be infected with a computer virus.

The decision of whether or not it is necessary to carry out a virus check in this job processing system is carried out based on the job data. If this is a decision made on the basis of the job data to be executed, it is possible to decide whether or not it is necessary to carry out a virus check according to the presence or absence of the possibility of vines infection even without executing the jobs and monitoring the operations, and it is possible to make immediate decisions without being affected by the operating status and irrespective of whether it is before a job is executed or if it is during the execution of a job. Even if the decision is made after starting the execution of a job in which a computer virus is involved, if it is immediately or a short time after that, since the result of judgment is obtained immediately at the time of making the decision, it is possible to suppress the damage by a computer virus. Because of this, even if the job processing system is already infected by a computer virus, or if a computer virus is involved in a job, because of immediate decision based on the job data, it is possible to decide whether or not a virus check is required before there is any damage by a computer virus.

Further, as a result of the decision of necessary or not necessary, it is possible to take a measure (treatment) of executing a virus check if it was decided to be necessary and to remove a computer virus if it was detected, before any damage is done by a virus. The targets of a virus check are, for example, job data, or saved data, etc.

Further, if the decision is based on job data, the decision making processing itself is simple and it is possible to suppress the processing load. For example, even if the decision making processing is executed during the processing of an earlier job, or during user operations, the load on the existing processing will be small. As a consequence, it is possible to decide whether or not a virus check is necessary without obstructing the processing that is currently being executed.

(2) In the abovementioned job processing system of item 1,
wherein the job data related to the job is a job data related to a job before it is executed by the execution section.

In the above item, it is possible to take quick action since the decision of whether or not a virus check is necessary is made before executing a job, and this is particularly desirable because measures can be taken before executing a job with which a computer virus is involved.

(3) In the abovementioned job processing system of item 1,
wherein, the control section decides that the detection by the detection section is necessary, when an abnormality is sensed based on the job data; and,
the detection section carries out the detection when the abnormality is sensed.

In the above item, a virus check is carried out when an abnormality is sensed based on the job data.

(4) In the abovementioned job processing system of item 3,
a second storage section stores the settings information upon accepting a settings completion in the operation section,
wherein the control section carries out the decision of whether or not the detection is necessary based on a result of comparing the job data stored in the first storage section and the settings information stored in the second storage section, and senses the abnormality when the result of the comparison is not matching.

In the above item, when the settings and completion operations are received from the user, the settings information indicating the contents of the settings at the time of completion of those settings is stored in the second storage section. The second storage section can be a different storage section from the first storage section that stores the generated job data, or can be the same storage section.

For example, if the configuration is such that the settings information in the process of making the settings of the job by the user (the individual information of each setting item) is stored continually and the settings information is confirmed when the settings completion is accepted, the settings information retained at the time of settings completion (at the time of confirmation) can also be the settings information stored in the second storage section. Further, if the configuration is such that the settings information retained at the time of settings completion is stored and saved in a different storage section, the settings information stored in this storage section can also be the settings information stored in the second storage section. The latter stored and saved settings information is the settings information copied from the settings information retained at the time of settings completion.

The job data, during normal operation except when during abnormal operation by a computer virus, that is, in the normal operation after receiving the job settings and completion operation from the user, is generated based on the settings information indicating the contents of settings at the time of settings completion of the job. The settings information used for generating the job data, becomes the settings information retained at the time of settings completion in the above former configuration, and in the latter configuration it is not the settings information retained at the time of settings completion but can also be the settings information stored (copied and saved) separately from this.

Further, even if the configuration is such that during normal operation the job data is generated based on the settings information at the time of settings completion by the user for the job and is stored in the first storage section, when an illegal job is generated illegally due to the abnormal operations caused by a computer virus, it is possible that job data not depending on the above correct settings information (illegal job data) is generated and stored. For example, without accepting the settings of the job from the user, or during the reception of the job settings from the user, it is possible that illegal job data is generated and stored due to a computer virus.

Here, any abnormality is sensed by comparing the job data generated and stored in the first storage section and the settings information stored in the second storage section indicating the contents of settings at the time of receiving the settings completion of the job. Further, in the configuration of storing in a separate storage section (the second storage section) the settings information retained at the time of settings completion, it is also possible to compare the job data with, apart from this settings information stored separately, the original settings information that has been retained.

For example, if the job data is tampered with by a computer virus during its generation or after it is stored in the first storage section, it will not match with the settings information indicating the contents of the settings at the time of accepting the settings completion and stored in the second storage section, and it is possible to sense the abnormality due to such data tampering.

Further, there is also the danger that the settings information itself after the settings completion of the job (the contents of setting at the time of settings completion) is tampered with by a computer virus. Against this, as has been described above, if the configuration is the one in which the settings information retained at the time of settings completion of the job is stored and saved in a separate storage section (the second storage section), it is desirable because it is possible to decrease the dangers of receiving such tampering.

(5) In the abovementioned job processing system of item 4,
wherein the settings of job comprises a setting of the operation mode indicating a type of job; and,
the control section carries out the comparison in the operation mode of the job data and in the operation mode of the settings information.

In the above item, any abnormality is sensed by comparing the operation mode in the job data generated and stored in the first storage section and the operation mode in said settings information stored in the second storage section indicating the contents of settings at the time of accepting the settings completion of the job. When the operation mode indicating the type of job is tampered with by a computer virus, it is possible that a large amount of damage is done depending on the type of job. For example, when the tampering is done so that a change is made from an operating mode classed as non-transmitting to an operation mode classed as transmitting, although there is the danger that a large amount of damage is done of spreading the infection to an external apparatus which is the destination of transmission and of information leakage, it is possible to sense such malicious tampering and to prevent the damage from occurring in advance.

Further, if only the operation mode is compared, for example, the comparison processing itself becomes simple and the processing load can be reduced compared to comparing a large number of/or all data values in the job data with the settings data corresponding to those data values (the individual information included in the settings data).

(6) In the abovementioned job processing system of item 4,
wherein, the comparison comprises,
a first comparison of comparing a prescribed number of data included in the job data and a prescribed number of information corresponding to the prescribed number of data included in the settings information, and
a second comparison of comparing a larger number of data than the prescribed number included in the job data and a larger number of information corresponding to the larger number of data included in the settings information, and
wherein the control section determines based on a prescribed condition whether to carry out the first comparison or the second comparison.

In the above item, at the time of sensing abnormality (determining whether or not to carry out a virus check) based on the result of comparing the job data with the settings information, whether to carry out a first comparison of comparing in a simple manner by making the number of the data and information to be compared less or to carry out a second comparison of carrying out detailed comparison by making the number of data and information to be compared large is determined based on prescribed conditions. In the first comparison, it is possible to reduce the processing load related to the comparison, and in the second comparison it is possible to more accurately detect the occurrence of abnormality.

(7) In the abovementioned job processing system of item 6, wherein the prescribed conditions comprises a margin of resources used for making a decision of whether or not the detection is necessary at a point of time when the determination is made, and, the control section determines whether to carry out the first comparison or the second comparison based on the margin of resources.

In the above item, whether to carry out the first comparison or to carry out the second comparison is decided based on, at the time of making that decision, the margin of the resources used for determining whether or not a virus check is necessary. The margin here implies the magnitude of the margin of the resources used for the target processing (in this case, the processing related to making the determination of whether or not a virus check is necessary). In this margin is included the absolute margin possessed by the resources themselves at the instant of time when the above determination is made. In addition, when the processing volume of the target processing (the size of the processing program, the size of the data handled during the processing, etc.) varies, it is also possible to make this include the relative margin that changes according to the varying processing volume.

For example, when the margin of the resources used is small for deciding whether or not a virus check is necessary (for example, when it is less than a prescribed value), in order to make sure that no bad effects such as delay, stagnation, or interruption, etc., are caused on the other processings that are being executed using this resource at present (the currently executed processings), the first comparison of simple comparison the job data with the settings information is carried out, and when the margin of resources is large (for example, when it is more than a prescribed value), since the probability of affecting the currently executed processing is low, it is possible to carry out the second comparison of comparing in detail the job data with the settings information. In this case, it is possible to carry out the first or the second comparison according to the margin of resources (for example, considering the currently executed processings).

(8) In the abovementioned job processing system of item 7, wherein the margin of resources is constituted from at least one of the remaining amount of usage of the resources and the remaining usage ratio of the resources.

In the above item, in the absolute margin possessed by the resources themselves at present (the instant of time when the decision of whether to carry out the first comparison or to carry out the second comparison) is included the remaining usage amount and the remaining usage ratio indicating the remaining size of the resources that are not being used by the current processing, and based on either one or both of these, the decision is made of whether to carry out the first comparison or to carry out the second comparison.

(9) In the abovementioned job processing system of item 6, wherein the prescribed conditions comprises the settings information at the time of accepting the settings completion; and, the control section determines whether to carry out the first comparison or the second comparison based on the settings information at the time of accepting the settings completion.

In the above item, which of the first comparison and the second comparison is to be carried out is determined based on the settings information at the time of receiving said settings completion. In the settings information of a job are included various types of processing conditions including the operation mode of the job, and, for example, this determination is made based on this operation mode or the contents of the different types of processings, etc.

In the case of operation modes, for example, it is also possible to determine based on distinguishing between transmitting and not transmitting to an external destination as indicated by the operation mode. It is also possible to determine by carrying out the detailed second comparison when transmitting to an external destination, and by carrying out the simple first comparison when not transmitting to an external destination. In the case of processing volume, for example, it is also possible to determine by carrying out the detailed second comparison when the number of sheets to be printed out or the number of destinations of transmission is large (for example, more than a prescribed value) and by carrying out the simple first comparison when the number of sheets to be printed out or the number of destinations of transmission is small (for example, less than a prescribed value). In the case of the type of transmission, it is also possible to determine by carrying out the detailed second comparison when the specific destinations (for example, destinations of high importance) are included in the destinations of transmission and by carrying out the simple first comparison when the specific destinations are not included in the destinations of transmission.

(10) In the abovementioned job processing system of item 6, wherein the settings of job comprises settings of an operation mode indicating the type of job; and, the operation mode is comprised in the data and the information compared by the first comparison and by the second comparison.

In the above item, at least the operation mode is compared during the first comparison and the second comparison between the job data and the settings information. While there is the possibility that the damage becomes large when the operation mode indicating the type of job is tampered with by a computer virus, by at least comparing the operation mode in the simple first comparison, it is possible to prevent in advance any damage due to the operation mode being tampered with. By making the operation mode the target of comparison even in the detailed second comparison, in a similar manner, it is possible to prevent in advance any damage due to the operation mode being tampered with.

(11) In the abovementioned job processing system of item 10, wherein, when the control section determines to carry out the first comparison, only the prescribed number of information including the operation mode in the settings information accepted at the time of settings completion of the job is stored in the storage section.

In the above item, when it is determined to carry out the simple first comparison, only a prescribed number of information items including said operation mode in the settings information accepted at the time of settings completion of said job are stored. It is possible to reduce the required storage area by limiting the information to be stored to only the minimum required prescribed number of information items.

(12) In the abovementioned job processing system of item 3, wherein, the control section carries out the decision of whether or not the detection is necessary based on whether or not the job data is the job data that is generated upon accepting the settings completion, and, the abnormality is detected when the job data is determined that it is not a job data generated upon accepting settings completion.

In the above item, if a job (job data) is generated not by a user operation but by a different cause (for example, by a computer virus), that job is determined to be an illegal job, and abnormalities are detected.

(13) In the abovementioned job processing system of item 12,
wherein, the control section measures the time elapsed from an instant of time of accepting the settings completion, and,
determines that the job data generated after a prescribed time has elapsed from the instant of time of accepting the settings completion is not the job data that is generated upon accepting the settings completion.

In the above item, although when a job settings completion operation is received from the user that job data is generated immediately, job data generated after a long time has elapsed after the instant of time of the reception of settings completion is determined to be illegal job data. By basing on the time elapsed from the instant of time of settings completion and the timing of the generation of a job (job data) in this manner, it is possible to identify illegal jobs that are not based on user operations, and to detect abnormalities.

(14) In the abovementioned job processing system of item 12,
wherein, setting of the operation mode indicating the type of job is comprised in the settings of jobs, and,
the control section determines that job data generated in the state in which the operation mode is not stored in the settings information in the second storage section is not a job data generated upon accepting the settings completion.

In the above item, in a configuration in which the settings information is stored at the time that the settings completion of a job is accepted from the user, job data generated in the state in which the operation mode is not stored in this settings information is determined to be illegal job data. By basing on the presence or absence of the operation mode in the settings information in this manner, it is possible to identify illegal jobs that are not based on user operations, and to detect abnormalities. In addition, since this is only the confirmation of the presence or absence of storing of the operation mode which is typical in the settings information, for example, compared to the case of carrying out confirmation of the presence or absence of storing a large number of or all the settings information items (the individual information included in the settings information), it is possible to simplify the processing itself of confirming the storing and to reduce the processing load.

Further, in storing the settings information, it is also possible to store only the operation mode in the settings information. In this case, for example, compared to the case of storing a large number of/or all the settings information items, since this is only storing of the operation mode which is typical in the settings information, it is possible to reduce the required storage capacity.

(15) In the abovementioned job processing system of item 5,
wherein, the operation mode is selected and set upon accepting a selection operation in the operation section during the settings of job, and,
the selected and set operation mode is stored to the second storage section as the operation mode of the settings information.

In the above item, the operation mode is selected by a job setting operation by the user, and is stored simultaneously with the job settings completion operation by the user. In this manner, using the operation mode that was specified (selected) by the user through actual operations, it is possible to detect abnormalities.

(16) In the abovementioned job processing system of item 5,
wherein, in the settings of job, a plurality of types of setting modes provided for each of the operation modes are changed by accepting the operation mode selection operations in the operation section, and the settings are accepted in a setting mode corresponding to the switched operation mode, and,
the setting mode at the time of generating the job data is stored as the operation mode to the second storage section.

In the above item, the setting mode is selected when the operation mode is selected during the job setting operations by the user. The setting mode is the state at the time of accepting the job settings (the status of the operation section), and a plurality of types of these is provided for each operation mode. This setting mode is stored as the operation mode at the time that the job data is generated. It is possible to detect abnormalities using such setting modes.

Further, since the settings information used for generating job data is related to the job data, when job data is tampered with by a computer virus, there is also the danger that even the settings information itself is tampered with at the same time. Against this, by storing the setting mode not directly related to the job data instead of the operation mode, when the job settings completion is received from the user, using the setting mode it is possible to store accurately and safely the operation mode specified by the user, and it is possible to detect abnormalities due to the tampering of such setting information (operation mode).

(17) In the abovementioned job processing system of item 3,
wherein, the control section carries out the decision of whether or not detection is necessary based on a data value included in the job data, and detects the abnormality when the data value is above a prescribed threshold value.

In the above item, when a data value included in the job data is tampered with by a computer virus to above a prescribed threshold value, it is detected as an abnormality. In this manner, based only the job data, it is possible to detect an abnormality.

(18) In the abovementioned job processing system of item 17,
wherein, the job includes a print job; and,
the job data related to the print job includes the number of copies as the data value.

In the above item, when the number of copies to be printed out (data value) included in the job data of a print job is above a prescribed threshold value, it is detected as an abnormality. In the case of a print job, it is possible to detect abnormalities in this manner based on the number of copies to be printed.

(19) In the abovementioned job processing system of item 17,
wherein, the job includes a transmission job,
the job data related to the transmission job includes the number of transmission destinations as the data value.

In the above item, when the number of transmission destinations (data value) included in the job data of a transmission job is above a prescribed threshold value, it is detected as an abnormality. In the case of a transmission job, it is possible to detect abnormalities in this manner based on the number of transmission destinations.

(20) In the abovementioned job processing system of item 19,
wherein, the control section checks whether or not there is a job under execution by the execution section after determined that the detection is necessary by the detection section and, when there is a job under execution, does not allow the detection section to carry out the detection until the execution of that job completion.

In the above item, if a job under execution is present when it is determined that a virus check is necessary, the processing of that job is given priority and the virus check is not carried out until the completion of processing of that job. Because of this, it is possible to avoid the processing of a job under execution being obstructed by the execution of a virus check.

(21) In the abovementioned job processing system of item 20,
wherein, when it is decided that the detection is necessary by the detection section, the control section further checks whether or not there is also a job waiting for execution by the execution section, and when there is also a job waiting for execution, after the completion of execution of a job currently under execution, temporarily suspends the execution of the job waiting for execution and causes the detection to be executed by the detection section.

In the above item, if a job under execution is present and also a job waiting for execution is present when it is decided that a virus check is necessary, after the completion of the processing of the job currently under execution, the job waiting for execution is temporarily suspended, and the virus check is carried out. Because of this, it is possible to carry out a virus check without obstructing the job under execution and at an early time (in case there is an infecting computer virus, before any damage is done by that virus) before the execution of the job waiting for execution.

(22) In the abovementioned job processing system of item 1, wherein, job settings includes a timer setting of a job execution starting, and the control section decides that the detection is not necessary, in the decision of whether or not the detection is necessary based on a job data which the timer is set.

In the above item, in the decision of whether or not a virus check is necessary based on the job data of a timer job for which an execution start timer has been set, the decision is made that the detection is not necessary.

(23) In the abovementioned job processing system of item 1, wherein, the control section decides that the detection is not necessary in the decision of whether or not the detection is necessary based on the job data related to a type of job for which it is not possible to accept settings from the operation section.

In the above item, in the decision of whether or not a virus check is necessary based on the job data of a type of job such as a reception job for which it is not possible to accept settings through operations by the user in said operation section, the decision is made that the detection is not necessary.

(24) An image processing apparatus included in a job processing system of claim 1, reflecting one aspect of the present invention and executes the jobs as jobs for image data, and is provided with the operation section, the storage section, the execution section, and the control section;

wherein the control section requests the detection section to detect computer viruses inside of the image processing apparatus, when the control section decided that detection by the detection section is necessary.

In the above item, the control section of an image processing apparatus, when it is decided during the decision of whether or not a virus check is necessary based on the job data that a virus check is necessary, requests an external detection section, for example, a server provided with a detection section to carry out the virus check within that apparatus. The external detection section accepting the request for a virus check from the image processing apparatus carries out the virus check inside the image processing apparatus. In this manner, even in an image processing apparatus that requests an external detection section to carry out virus check inside the apparatus, it is possible to decide whether or not a virus check is necessary without obstructing the processing and before any damage is done by a computer virus. When the image processing apparatus decides that a virus check is necessary inside that apparatus, it is possible to carry out the virus check inside the apparatus by an external detection section.

According to the job processing system and image processing apparatus according to these preferred embodiments, it is possible to determine whether or not a virus check is necessary without obstructing the processing and before any damage is done by a computer virus. Further, at an appropriate time it is possible to carry out a virus check that was determined to be necessary. Therefore, even in a case in which it is difficult to execute a virus check (program) periodically and frequently in order to avoid reduction in the processing performance, it becomes possible to execute a virus check efficiently, and to prevent in advance any damage by a computer virus.

What is claimed is:

1. A job processing system of a multifunction printer comprising:
    an operation section accepting settings of a job;
    a generate section generating job data based on settings information related to the settings of the job upon accepting a settings completion in the operation section;
    a first storage section storing the generated job data;
    an execution section executing the job based on the generated job data;
    a detection section detecting computer viruses within the job processing system;
    a control section deciding necessity of detecting by the detection section based on job data related to the job; and,
    a second storage section storing the settings information upon accepting the settings completion in the operation section,
    wherein,
        the control section carries out the decision of whether or not detection is necessary based on a result of comparing the job data stored in the first storage section and the settings information stored in the second storage section; senses an abnormality when the result of the comparison is not matching; and decides that detecting by the detection section is necessary; and,
        the detection section carries out the detection when the abnormality is sensed.

2. The job processing system of claim 1, wherein, the job data related to the job is job data related to the job before it is executed by the execution section.

3. The job processing system of claim 2, wherein, the settings information of the job comprises a setting of an operation mode indicating a type of job; and,
    the control section carries out the comparison in the operation mode of the job data and in the operation mode of the settings information.

4. The job processing system of claim 3, wherein, the operation mode is selected and set upon accepting a selection operation in the operation section during the settings of the job; and,
    the selected and set operation mode is stored to the second storage section as the operation mode of the settings information.

5. The job processing system of claim 3, wherein, in the settings of the job, a plurality of types of setting modes provided for each of the operation modes are changed by accepting an operation mode selection operations in the operation section, and the settings are accepted in a setting mode corresponding to a switched operation mode; and,
    the setting mode at the time of generating the job data is stored as the operation mode to the second storage section.

6. The job processing system of claim 2, wherein, the comparison comprises:
    a first comparison of comparing a prescribed number of data included in the job data and a prescribed number of information corresponding to the prescribed number of data included in the settings information; and a second comparison of comparing a larger number of data than the prescribed number included in the job data and a larger number of information corresponding to the larger number of data included in the settings information, and wherein the control section determines, based on a prescribed condition, whether to carry out the first comparison or the second comparison.

7. The job processing system of claim 6, wherein, the prescribed condition comprises a margin of resources used for making a decision of whether or not the detection is necessary at a point of time when the decision is made; and, the control section determines whether to carry out the first comparison or the second comparison based on the margin of resources.

8. The job processing system of claim 7, wherein, the margin of resources is determined based on at least one of a remaining amount of usage of the resources and a remaining usage ratio of the resources.

9. The job processing system of claim 6, wherein, the prescribed condition comprises settings information at the time of accepting the settings completion; and, the control section determines whether to carry out the first comparison or the second comparison based on the settings information at the time of accepting the settings completion.

10. The job processing system of claim 6, wherein, the settings of the job comprises settings of an operation mode indicating the type of job; and, the operation mode is comprised in the generated job data and the information compared by the first comparison and by the second comparison.

11. The job processing system of claim 10, wherein, when the control section carries out the first comparison, only the prescribed number of information including the operation mode in the settings information accepted at the time of settings completion of the job is stored in the second storage section.

12. The job processing system of claim 1, wherein, the control section checks whether or not there is a job under execution by the execution section after determining that detection is necessary by the detection section; and, when there is a job under execution, does not allow the detection section to carry out detection until execution of the job under execution is complete.

13. The job processing system of claim 12, wherein, when it is decided that the detection is necessary by the detection section, the control section further checks whether or not there is also a job waiting for execution by the execution section, and when there is also a job waiting for execution, temporarily suspends execution of the job waiting for execution until execution of a job currently under execution is complete, and then causes detection to be executed by the detection section.

14. The job processing system of claim 1, wherein, settings of a job include a timer setting of a job execution start time; and the control section decides whether or not detection is necessary based on the timer setting.

15. The job processing system of claim 1, wherein, the control section decides that the detection is not necessary, in the decision of whether or not the detection is necessary based on whether it is the job data related to a type of job for which it is not possible to accept settings from the operation section.

16. An image processing apparatus included in a job processing system of claim 1 for executing the job as image data, and is provided with the operation section, the storage section, the execution section, and the control section; wherein the control section requests the detection section to detect computer viruses inside of the image processing apparatus, when the control section decides that detection by the detection section is necessary.

17. A job processing system of a multifunction printer comprising:

an operation section accepting settings of a job;

a generate section generating job data based on settings information related to the settings of the job upon accepting a setting completion in the operation section;

a first storage section storing the generated job data;

an execution section executing the job based on the generated job data;

a detection section detecting computer viruses within the job processing system; and a control section deciding necessity of detecting by the detection section based on job data related to the job;

wherein, the control section carries out the decision of whether or not detection is necessary based on whether or not the job data is job data that is generated upon accepting the settings completion;

an abnormality is sensed when it is determined that the job data is not job data generated upon accepting the settings completion; and the detection section carries out the detection when the abnormality is sensed.

18. The job processing system of claim 17, wherein, the control section measures a time elapsed from an instant of time of accepting the settings completion; and, determines that job data generated after a prescribed time has elapsed from the instant of time of accepting the settings completion is not the job data generated upon accepting the settings completion.

19. A job processing system of a multifunction printer comprising:

an operation section accepting settings of a job;

a generate section generating job data based on settings information related to the settings of the job upon accepting a settings completion in the operation section;

a first storage section storing the generated job data;

an execution section executing the job based on the generated job data;

a detection section detecting computer viruses within the job processing system; and a control section deciding necessity of detecting by the detection section based on job data related to the job;

wherein, the control section carries out the decision of whether or not detection is necessary based on a data value included in the job data, and senses an abnormality when the data value is above a prescribed threshold value; and the detection section carries out the detection when the abnormality is sensed.

20. The job processing system of claim 19, wherein, the job includes a print job; and, job data related to the print job includes a number of copies as the data value.

21. The job processing system of claim 19, wherein,
the job includes a transmission job; and
job data related to the transmission job includes a number of transmission destinations as the data value.

22. An image processing apparatus of a multifunction printer comprising:
an operation section accepting settings of a job;
a generate section generating job data based on settings information related to the settings of the job upon accepting a settings completion in the operation section;
a first storage section storing the generated job data;
an execution section executing the job based on the generated job data;
a detection section detecting computer viruses within the image processing apparatus;
a control section deciding necessity of detecting by the detection section based on job data related to the job; and,
a second storage section storing the settings information upon accepting the settings completion in the operation section,
wherein,
the control section carries out the decision of whether or not detection is necessary based on a result of comparing the job data stored in the first storage section and the settings information stored in the second storage section, senses an abnormality when the result of the comparison is not matching, and decides that detecting by the detection section is necessary; and,
the detection section carries out detection when the abnormality is sensed.

23. An image processing apparatus of a multifunction printer comprising:
an operation section accepting settings of a job;
a generate section generating job data based on settings information related to the settings of the job upon accepting a settings completion in the operation section;
a first storage section storing the generated job data;
an execution section executing the job based on the job data;
a detection section detecting computer viruses within the image processing apparatus; and
a control section deciding necessity of detecting by the detection section based on job data related to the job;
wherein,
the control section carries out the decision of whether or not detection is necessary based on whether or not the job data is job data that is generated upon accepting the settings completion; an abnormality is sensed when it is determined that the job data is not the job data generated upon accepting settings completion; and,
the detection section carries out the detection when the abnormality is sensed.

24. The image processing apparatus of claim 23, wherein,
the control section measures a time elapsed from an instant of time of accepting the settings completion; and,
determines that job data generated after a prescribed time has elapsed from the instant of time of accepting the settings completion is not the job data that is generated upon accepting the settings completion.

25. An image processing apparatus of a multifunction printer comprising:
an operation section accepting settings of a job;
a generate section generating job data based on settings information related to the settings of the job upon accepting a settings completion in the operation section;
a first storage section storing the generated job data;
an execution section executing the job based on the job data;
a detection section detecting computer viruses within the image processing apparatus; and
a control section deciding necessity of detecting by the detection section based on job data related to the job;
wherein,
the control section carries out the decision of whether or not detection is necessary based on a data value included in the job data, and senses an abnormality when the data value is above a prescribed threshold value; and
the detection section carries out detection when the abnormality is sensed.

26. A virus detection method of an image processing apparatus of a multifunction printer comprising:
a step accepting settings of a job by an operation section;
a step generating job data based on settings information related to the settings of the job upon accepting a settings completion in the operation section by a generate section;
a step storing the generated job data into a first storage section;
a step storing the settings information upon accepting a settings completion in the operation section by a second storage section;
a step executing the job based on the job data by an execution section;
a detecting step detecting computer viruses within the image processing apparatus; and
a deciding step deciding necessity of detecting by the detecting step based on job data related to the job; and,
wherein:
the deciding step carries out the decision of whether or not detection is necessary based on a result of comparing the job data stored in the first storage section and the settings information stored in the second storage section, senses an abnormality when the result of the comparison is not matching, and decides that detection by the detection step is necessary; and,
the detecting step carries out detection when the abnormality is sensed.

27. A virus detection method of an image processing apparatus of a multifunction printer comprising:
a step accepting settings of a job by an operation section;
a step generating job data based on settings information related to the settings of the job upon accepting a settings completion in the operation section by a generate section;
a step storing the generated job data into a first storage section;
an executing step executing the job based on the job data by an execution section;
a detecting step detecting computer viruses within the image processing apparatus; and,
a deciding step deciding necessity of detecting by the detecting step based on job data related to the job; and,
wherein,
the deciding step carries out the decision of whether or not detection is necessary based on whether or not the job data is job data that is generated upon accepting the settings completion; and,
an abnormality is sensed when it is determined that the job data is not job data generated upon accepting settings completion; and, the detecting step carries out detection when the abnormality is sensed.

28. The virus detection method of claim 27, wherein the deciding step measures the time elapsed from an instant of time of accepting the settings completion; and determines that job data generated after a prescribed time has elapsed from the instant of time of accepting the settings completion is not job data that is generated upon accepting the settings completion.

29. A virus detection method of an image processing apparatus of a multifunction printer comprising;
   a step accepting settings of a job by an operation section;
   a step generating job data based on settings information related to the settings of the job upon accepting a settings completion in the operation section;
   a step storing the generated job data into a first storage section by a generate section;
   an executing step executing the job based on the job data by an execution section;
   a detecting step detecting computer viruses within the image processing apparatus; and,
   a deciding step deciding necessity of detecting by the detecting step based on job data related to the job; and, wherein,
      the deciding step carries out the decision of whether or not detection is necessary based on a data value included in the job data, and senses an abnormality when the data value is above a prescribed threshold value; and
      the detecting step carries out detection when the abnormality is sensed.

30. A non-transitory computer readable storage medium storing a virus detection program which causes a computer of a multifunction printer to:
   accept settings of a job by an operation section;
   generate job data based on settings information related to the settings of the job upon accepting a settings completion in the operation section by a generate section;
   store the generated job data into a first storage section;
   store the settings information upon accepting a settings completion in the operation section by a second storage section;
   execute the job based on the job data by an execution section;
   detect computer viruses within an job processing system; and
   decide the necessity of detecting by the detecting step based on job data related to the job; and
   wherein the virus detection program causes the computer to:
      decide whether or not detection is necessary based on a result of comparing the job data stored in the first storage section and the settings information stored in the second storage section, sense an abnormality when the result of the comparison is not matching, and decide that detection by the detection step is necessary; and,
      carry out detection when the abnormality is sensed.

31. A non-transitory computer readable storage medium storing a virus detection program which causes a computer of a multifunction printer to:
   accept settings of a job by an operation section;
   generate a job data based on settings information related to the settings of the job upon accepting a settings completion in the operation section;
   store the generated job data into a first storage section;
   execute the job based on the job data by an execution section;
   detect computer viruses within the job processing system; and
   decide the necessity of detecting by the detecting step based on job data related to the job; and
   wherein the virus detection program causes the computer to:
      carry out the decision of whether or not detection is necessary based on whether or not the job data is job data that is generated upon accepting the settings completion; and,
      senses an abnormality when it is determined that the job data is not job data generated upon accepting settings completion; and,
      carry out detection when the abnormality is sensed.

32. The non-transitory computer readable storage medium storing a virus detection program of claim 31, wherein the virus detection program causes the computer to:
   measure the time elapsed from an instant of time of accepting the settings completion; and
   determine that job data generated after a prescribed time has elapsed from the instant of time of accepting the settings completion is not job data that is generated upon accepting the settings completion.

33. A non-transitory computer readable storage medium storing a virus detection program which causes a computer of a multifunction printer to:
   accept settings of a job by an operation section;
   generate job data based on settings information related to the settings of the job upon accepting a settings completion in the operation section;
   store the generated job data into a first storage section by a generate section;
   execute the job based on the job data by an execution section;
   detect computer viruses within a job processing system; and
   decide the necessity of detecting by the detecting step based on job data related to the job; and
   wherein the virus detection program causes the computer to:
      carry out the decision of whether or not detection is necessary based on a data value included in the job data, and detects an abnormality when the data value is above a prescribed threshold value; and,
      carry out detection when the abnormality is sensed.

\* \* \* \* \*